United States Patent [19]
Watts

[11] Patent Number: 5,996,084
[45] Date of Patent: Nov. 30, 1999

[54] METHOD AND APPARATUS FOR REAL-TIME CPU THERMAL MANAGEMENT AND POWER CONSERVATION BY ADJUSTING CPU CLOCK FREQUENCY IN ACCORDANCE WITH CPU ACTIVITY

[75] Inventor: Vaughn Watts, Temple, Tex.

[73] Assignee: Texas Instruments Incorporated, Dallas, Tex.

[21] Appl. No.: 08/785,619

[22] Filed: Jan. 17, 1997

[51] Int. Cl.$^6$ .................................................. G06F 1/32
[52] U.S. Cl. ........................ 713/323; 713/322; 713/501
[58] Field of Search .................. 395/750.01–750.08, 395/551–560; 713/300–340, 400–601

[56] References Cited

U.S. PATENT DOCUMENTS

| | | | |
|---|---|---|---|
| 5,218,704 | 6/1993 | Watts, Jr. et al. | 395/750.04 |
| 5,422,806 | 6/1995 | Chen et al. | 364/149 |
| 5,422,832 | 6/1995 | Moyal | 364/557 |
| 5,451,892 | 9/1995 | Bailey | 327/113 |
| 5,490,059 | 2/1996 | Mahalingaiah et al. | 364/166 |
| 5,535,401 | 7/1996 | Rawson, III et al. | 395/750.08 |
| 5,561,792 | 10/1996 | Ganapathy | 395/556 |
| 5,572,719 | 11/1996 | Biesterfeldt | 395/555 |
| 5,623,647 | 4/1997 | Maitra | 395/556 |
| 5,630,110 | 5/1997 | Mote, Jr. | 395/556 |
| 5,630,148 | 5/1997 | Norris | 395/750.04 |
| 5,713,030 | 1/1998 | Evoy | 395/750.04 |
| 5,721,837 | 2/1998 | Kikinis et al. | 395/281 |
| 5,752,011 | 5/1998 | Thomas et al. | 395/556 |
| 5,774,704 | 6/1998 | Williams | 395/556 |
| 5,826,083 | 10/1998 | Prasad | 395/675 |
| 5,832,284 | 11/1998 | Michail et al. | 395/750.04 |

FOREIGN PATENT DOCUMENTS

| | | |
|---|---|---|
| 0 426 410 A2 | 10/1990 | European Pat. Off. . |
| 0 566 395 A1 | 4/1993 | European Pat. Off. . |
| 0 683 558 A1 | 5/1995 | European Pat. Off. . |

*Primary Examiner*—Glenn A. Auve
*Assistant Examiner*—Rupal D. Dharia
*Attorney, Agent, or Firm*—Ronald O. Neerings; Richard L. Donaldson

[57] ABSTRACT

A method and system (130) for controlling sensed CPU dynamic operating characteristics, such as CPU temperature, temperature change and power consumption, including the steps of and circuitry for sensing at least one dynamic CPU operating characteristic (140) while the CPU operates at a first clock rate (134). The system (130) determines that a setpoint interrupt condition exists (140), such as a temperature threshold, by virtue of the at least one sensed CPU dynamic operating characteristic establishing a predetermined relationship relative to a predetermined setpoint (140) that associates with the at least one dynamic operating characteristic. In the event that the setpoint interrupt condition exists, the circuitry and instructions control (144) the clock rate relative to the first clock rate. In the event that the setpoint interrupt condition does not exist, the circuitry and instructions repeat the above steps of determining the interrupt condition and controlling the clock rate. The method and system (130) also determine whether the CPU is in a compute-bound state (142). This operation in conjunction with a real-time power conservation apparatus and method (20) is a particularly attractive feature of the present invention.

90 Claims, 7 Drawing Sheets

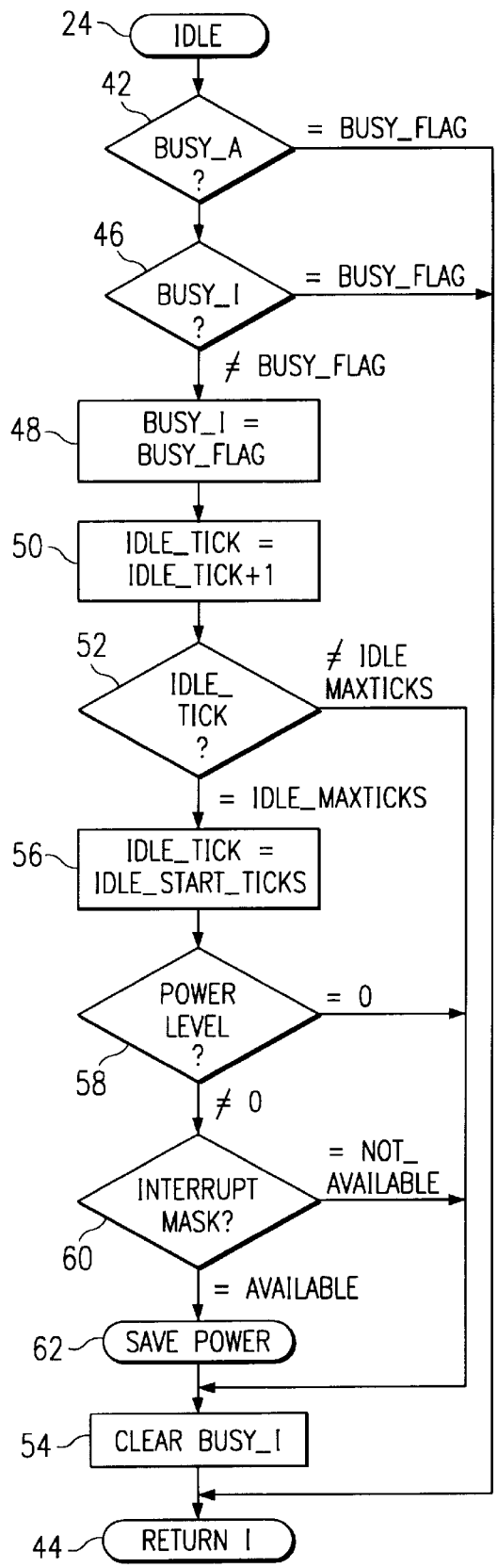
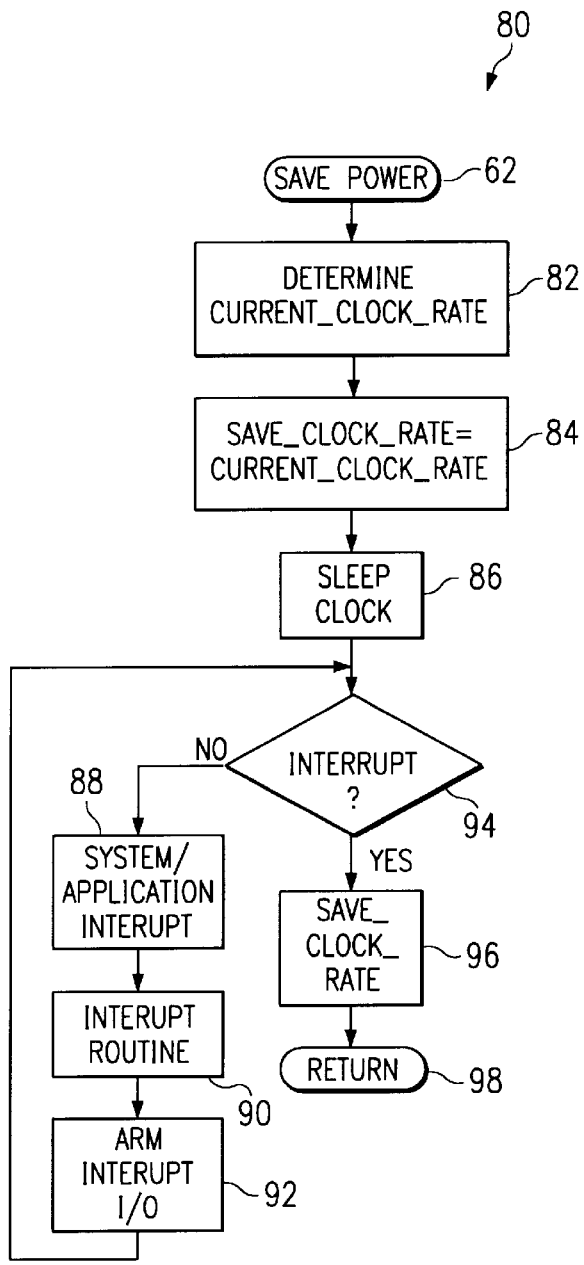
FIG. 2b
FIG. 2c

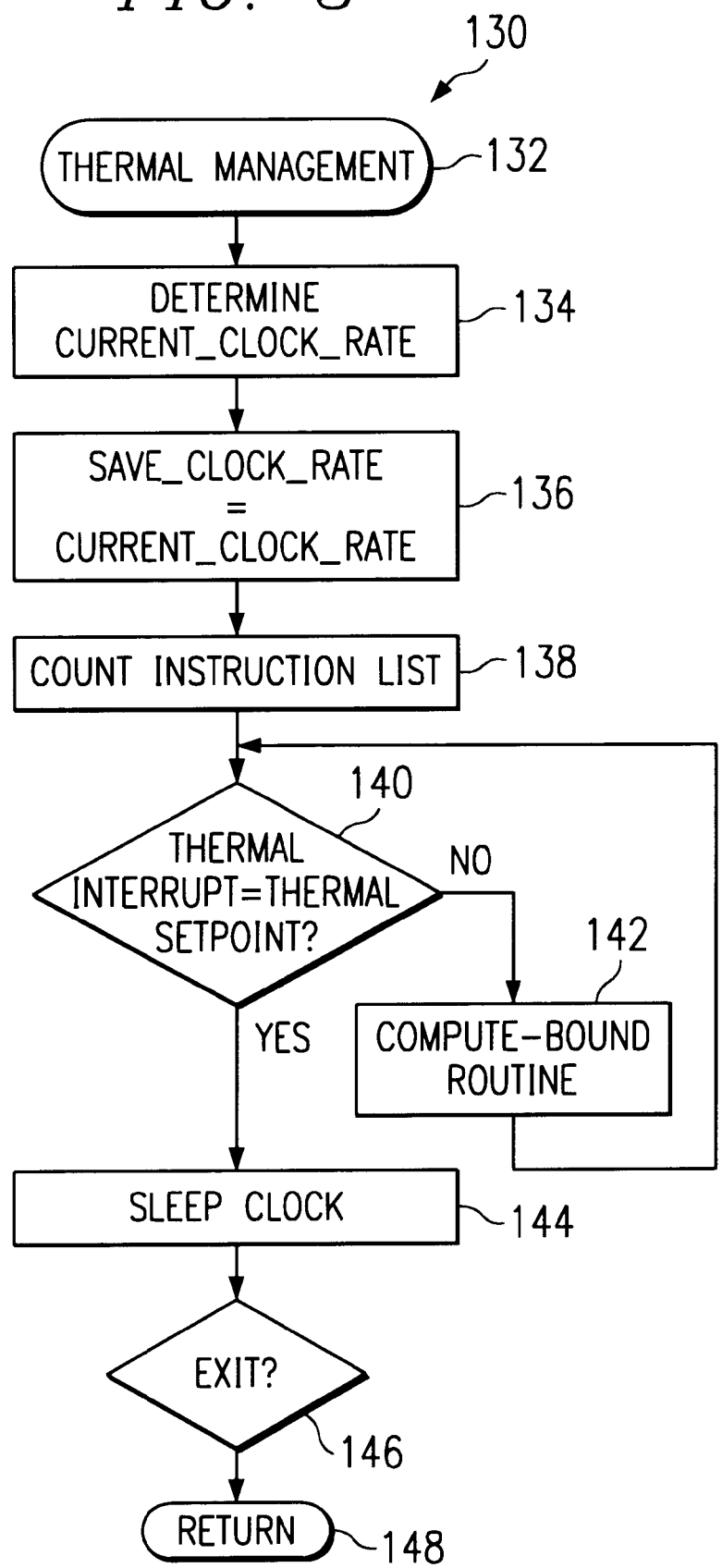

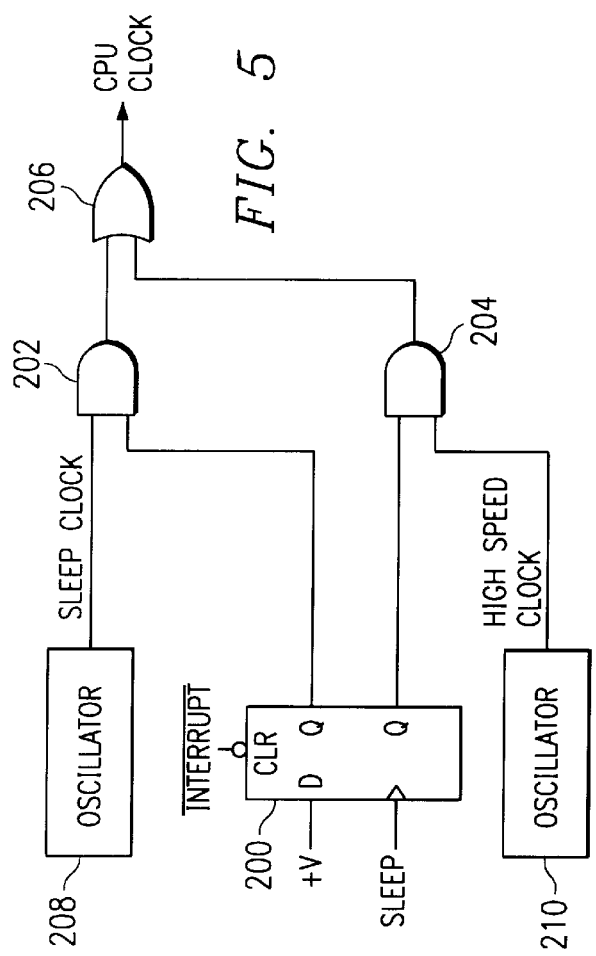
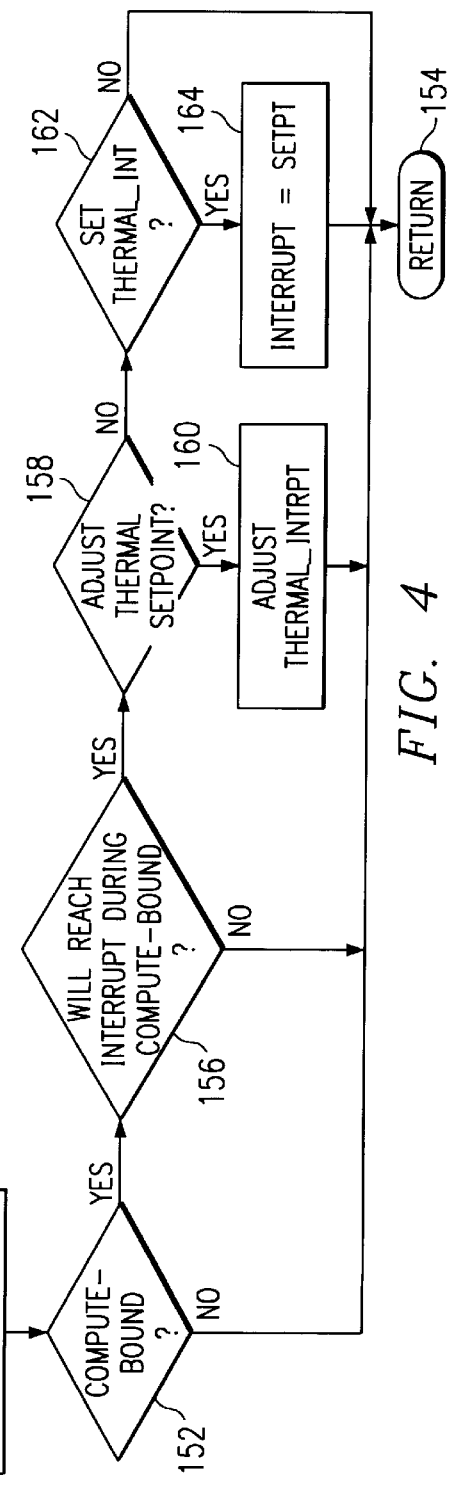
FIG. 5
FIG. 4

METHOD AND APPARATUS FOR REAL-TIME CPU THERMAL MANAGEMENT AND POWER CONSERVATION BY ADJUSTING CPU CLOCK FREQUENCY IN ACCORDANCE WITH CPU ACTIVITY

TECHNICAL FIELD OF THE INVENTION

This invention relates to real-time computer central processing unit (CPU) control and, more particularly, to an apparatus and method for adjusting central processing unit (CPU) clock rate based on sensed dynamic operating characteristics, such as CPU temperature, temperature change and power consumption, arising from the real-time activity level within the CPU.

BACKGROUND OF THE INVENTION

In the early developmental stages of the personal computer industry, the transportable or portable computer became very popular. The earlier portable computers use a large power supply and, in actuality, represent a small desktop personal computer. Portable computers available today, on the other hand, are smaller and lighter than a desktop personal computer and allow a user to employ the same software that a desktop computer uses.

The first generation "portable" computers only operate from alternating current wall power. More recent, or next generation, personal computers may use battery power and are truly portable. This enhanced degree of portability arises from recent developments in display technology, disk storage capabilities, and component weight and space technology.

While these advancements help to reduce the size of portable computers, operational limitations yet exist. For example, software that today's portable computers run is generally the same as that which desktop personal computers run. Hence, a portable computer must provide all of the features of a desktop computer, without regard to functional limitations and considerations that are unique to battery-powered portable computers. Portable computers, on the one hand, have the same data flow rates as the desktop computers and, on the other hand, have only limited amounts of power available for short periods of time and may have more limited heat dissipation capability than desktop computers. Today's portable computers make no special accommodations for the differing platforms in the software that they operate. Operating systems (e.g., MS-DOS), Basic Input/Output System (BIOS) software and third party application software is essentially the same for both the portable and desktop computers. This is particularly true with respect to the ways that the software systems handle the different dynamic operating characteristics of the CPU.

As software engineers and programmers develop more highly functional software systems, desktop computers continue to provide increased performance in essentially all areas of system performance. From the introduction of higher computationally capable CPUs, to increased memory, and faster high performance disk drives, demands for operating capabilities of desktop systems are rapidly rising. Portable computer manufacturers really have little choice other than to try to stay apace with these demands.

To date, however, portable computers continue to run either only on A/C power or with large and heavy batteries. In trying to keep up with the performance requirements of the desktop computers, and the new software, some portable computers use expensive components to cut the power requirements. Even so, the heavy batteries that the computers use still fail to provide power for long durations. This means users of conventional portable computers must settle for alternating current wall-powered operation or very short duration battery operation in order to have the performance that third party software systems expect.

In an attempt to design a portable computer that conserves power and that, thereby, yields longer battery operation, some portable computer power systems reduce power consumption of a portable computer while a user is not using the computer. Other portable computer designers conserve power by turning the computer display off when the keyboard is not being used. While these systems help conserve power, they are either impractical because they hinder computer operations or they fail to conserve power when the greatest amount of power drain occurs in the computer. To date, no power conservation system for a portable computer conserves power while the operator uses the computer for meaningful work.

But this is not the only problem with the power supply systems for portable computers. In today's portable computer systems, there is no intelligent system that responds to CPU dynamic operating characteristics. The dynamic operating characteristics of the CPU may include a wide variety of characteristics, including CPU temperature, temperature changes, power consumption, and others. No method or system exists to manage the conservation or optimal use of battery power. No method or system exists to properly monitor and manage the temperature of the rapidly operating and dense electronic circuitry of the CPU in response to compute intensive instructions. Moreover, no method or system exists to assure that when the CPU is effectively isolated from its input/output circuitry that no undesirable effects from dynamic operating characteristics of the CPU will occur. The type of undesirable situations or effects that may occur include the CPU excessively consuming power or reaching excessive temperatures when the CPU executes a large set of instructions that do not include any input/output functions.

SUMMARY OF THE INVENTION

There is the need for an apparatus and method for predicting the activity level within a CPU and using the prediction to automatically manage CPU dynamic operating characteristics.

There is a need for a feedback method and apparatus which allows user modification of automatic activity level predictions and, using the modified predictions, automatically manage the dynamic operating characteristics of the CPU.

There is a further need for an apparatus and method that provides real-time reduction and restoration of clock speeds in response to managing dynamic operating characteristics of the CPU, thereby returning the CPU to its full processing rate from a period of inactivity, but in a way that is transparent to software programs and to the user.

Even still, there is the need for an apparatus and method which determines, based on dynamic operating characteristics, whether a CPU may or should rest based upon the CPU activity level and that activates a hardware selector based upon that determination. If the CPU may rest, or sleep, the hardware selector applies oscillations at a sleep clock level. If the CPU must be active, the hardware selector applies oscillations at a high speed clock level.

The present invention examines the state of CPU activity, as well as the activity of both the operator and any application software program currently active. The present invention performs this sampling of activity in real time, adjusting the performance level of the CPU to manage power conservation, computer power and the thermal conditions, as well as any other appropriate and desired dynamic operating characteristics. These adjustments are accomplished within the CPU cycles and do not affect the user's perception of performance or the operation of other software programs.

The present invention, according to a preferred embodiment, provides a method and apparatus for controlling the sensed CPU dynamic operating characteristics, and includes the steps of sensing at least one CPU dynamic operating characteristic. The method and apparatus sense the clock rate for the CPU at the time of sensing the operating characteristic. Determining that a setpoint interrupt condition exists by virtue of at least one dynamic operating characteristic establishing a predetermined relationship relative to a predetermined setpoint associated with the at least one dynamic operating characteristic is a next step of the method that the present invention performs. In the event that the setpoint interrupt condition exists, the method and apparatus either controls the clock rate of the CPU, adjusts the predetermined setpoint, or in another way manages the CPU dynamic operating characteristics. On the other hand, in the event that the setpoint interrupt condition does not exist, the method and apparatus repeats the above determining and controlling steps to effectively manage the CPU dynamic operating characteristics.

Thus, when the operator for the third party software of the operating system/BIOS is not using the computer, the present invention, in conserving power, may effect a quick turn off or slow down of the CPU until needed, thereby causing the operating characteristics to shift to a lower state. The present system promptly restores full CPU operation when needed without affecting perceived performance. This switching back into full operation from the "slow down" mode occurs without the user having to request it and without any delay in the operation of the computer while waiting for the computer to return to a "ready" state.

A technical advantage that the present invention provides is the ability to preview or predict the operating characteristics of the CPU. By counting the number of instructions and determining their type, the present invention determines whether the CPU will be in a compute-bound mode of operation wherein little or no input/output and, hence, no slow-down of and no input/output function to the CPU will occur. This preview makes it possible to determine whether, during the compute-bound mode, one or more of the CPU dynamic operating characteristics will reach an associated predetermined setpoint. If so, the present invention adjusts the clock rate, modifies the predetermined setpoint or otherwise changes CPU operation to avoid the adverse consequences of making a specific predetermined setpoint.

Yet another technical advantage of the present invention is its ability to accommodate changes in CPU dynamic operating characteristics, not only in the instance of a single CPU computer, but also in a multiple or parallel CPU computer system. In fact, a set of parallel CPUs may be configured with the present invention to maintain a desired average clock rate among all of the CPUs while one or more CPUs adjusts in response to an interrupt condition arising relative to the CPU's dynamic operating characteristics.

BRIEF DESCRIPTION OF THE DRAWINGS

The features and advantages of the present invention will be apparent to those skilled in the art from the following detailed description of a preferred embodiment, taken together with the accompanying drawings, in which:

FIGS. 2a–2d are flowcharts depicting the active power conservation monitor employed by the present embodiment of invention;

FIG. 3 depicts a simplified flow chart of a thermal management method that the present embodiment employs;

FIG. 4 shows a flowchart of the compute-bound determination steps that the present embodiment uses;

FIG. 5 provides a simplified schematic diagram representing the active power conservation associated hardware employed by the present embodiment of the invention;

DETAILED DESCRIPTION OF THE INVENTION

Figure 1:
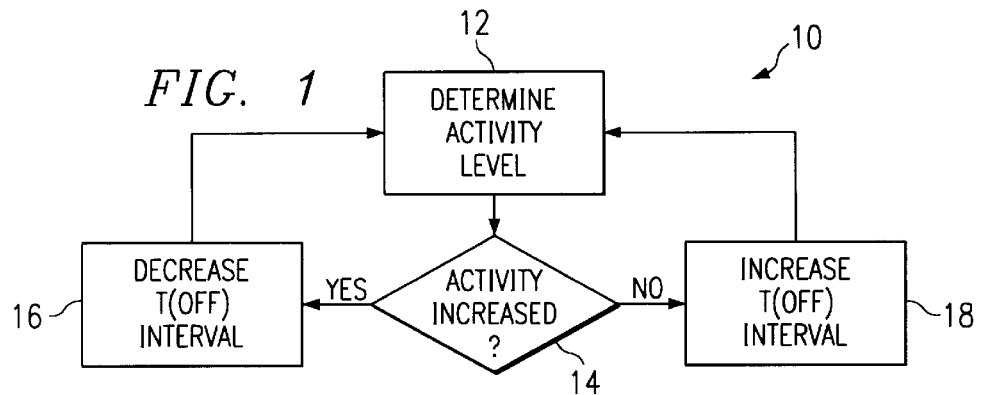
FIG. 1 is a flowchart depicting a self-tuning aspect of a preferred embodiment of the present invention.

The following discussion relates to the power conservation aspects of the present invention. The present invention, however, further includes the method and apparatus for controlling other CPU dynamic operating characteristics in addition to power conservation or consumption.

If the period of computer activity in any given system is examined, the CPU and associated components have a utilization percentage. If the user inputs data from a keyboard, for example, the time between keystrokes is very long in terms of CPU cycles. The computer can accomplish many things during this time, such as printing a report. Even while printing a report, time still is exists for additional operations such as updating a clock/calendar display background. Even so, there is almost always still spare time when the CPU is not in use. The present invention provides a way to turn off or slow the CPU down during this spare time to achieve real-time power conservation that extends the life of the computer's battery.

According to the preferred embodiment of the present invention, to control the CPU dynamic operating characteristics under MS-DOS, as well as other operating systems such as OS/2, UNIX, Windows™ and those for Apple computers, requires a combination of hardware and software. It should be noted that because the present embodiment works in any system, and while the implementation may vary slightly on a system-by-system basis, the scope of the present invention should, therefore, not be limited to computer systems operating under MS/DOS or any other specific operating system.

Slowing down or stopping the computer system components, according to the preferred embodiment of the present invention, reduces power consumption, lowers operating temperatures, or otherwise controls dynamic operating characteristics, although the amount of control or change may vary from one system to another. Therefore, according to the present embodiment, stopping the clock (where possible realizing, however, some CPUs cannot have their clocks stopped) reduces the power consumption more than just slowing the clock.

In general, the number of CPU operations (or instructions) per second may be considered to be roughly proportional to the CPU clock:

$$\text{instructions/second} = \text{instructions/cycle} * \text{cycles/second} \tag{1}$$

Assuming for simplicity that the same instruction is repeatedly executed so that instructions per second is constant, the relationship can be expressed as follows:

$$F_q = K_1 * Clk \tag{2}$$

where $F_q$ represents the number of instructions per second, $K_1$ represents value having the units of instructions per cycle, and Clk also represents the number of cycles per second. Thus, roughly speaking, the rate of execution increases with the frequency of the CPU clock.

The amount of power that the computer uses at any given moment also relates to the frequency of the CPU clock and, therefore, to the CPU's execution rate. In general, the following expression captures this relationship:

$$P = K_2 + (K_3 * Clk) \tag{3}$$

where P represents power in watts, $K_2$ represents a constant value having the units of watts, $K_3$ is a constant that expresses the number of watt-seconds/cycle, and Clk equals the cycles/second of the CPU clock. Thus, from Equation (3) it follows that, as the CPU clock frequency increases, the amount of power that the CPU consumes at any given time also increases.

A given time period, T, may be divided into n intervals so that the power, P, is constant during each interval, and the amount of energy, E, that the CPU expends during the total period may be expressed as T follows:

$$E = P(1)\Delta T_1 + P(2)\Delta T_2 + \ldots + P(n)\Delta T_N \tag{4}$$

Assuming further that the CPU clock, Clk, has only two states, either "ON" or "OFF". Here, the "ON" state represents the CPU clock state at its maximum frequency, while the "OFF" state represents the clock state at the minimum frequency at which the CPU can operate. Note that this minimum clock rate may be zero for CPUs capable of having their clocks stop. For the condition in which the CPU clock is always "ON," each P(i) in the previous equation is equal and the total energy is:

$$E(\max) = P(\text{ON}) * (\Delta T_1 + \Delta T_2 + \ldots + \Delta T_n) = P(\text{ON}) * T \tag{5}$$

where P(ON) represents the power being consumed when the clock in its "ON" state, while P(OFF) represents the power being used when the clock is "OFF". This represents the maximum power consumption of the computer in which no measures are taken to control the CPU dynamic operating characteristics. If the CPU clock is "OFF" during a portion of the intervals 1 through 4, then each interval may include two power levels. If all of the time intervals in which the clock is "ON" is summed into the quantity T(ON), and the "OFF" intervals are summed into T(OFF), then the following expression is true:

$$T = T(\text{ON}) + T(\text{OFF}) \tag{6}$$

Now, the energy that the CPU uses during the period, T, may be written in the following manner:

$$E = [P(\text{ON}) * T(\text{ON})] + [P(\text{OFF}) * T(\text{OFF})] \tag{7}$$

Under these conditions, the total energy that the CPU consumes may be reduced by increasing the time intervals, T(OFF). Thus, by controlling the periods of time that the clock is in its "OFF" state, the present embodiment reduces the amount of energy that the CPU uses. By dividing the T(OFF) period into a large number of intervals during the period, T, the present embodiment shows clearly that energy consumption approaches its maximum value as the width of each interval approaches zero. Conversely, energy consumption decreases as the width of the T(OFF) intervals increase.

Arranging the "OFF" intervals to coincide with periods during which the CPU is normally inactive, makes computer system operation such that a user cannot perceive a reduction in performance, while the present embodiment reduces the overall energy consumption from the E(max) state. In order to align the T(OFF) intervals with periods of CPU inactivity, the present embodiment determines the CPU activity level widths T(OFF) interval using a closed loop, such as closed loop 10 that FIG. 1 depicts. Continuing to describe FIG. 1, CPU activity level is determined at step 12. If this level is an increase over an immediately previous determination, query 14 sends process flow to step 16 where the present invention decreases the T(OFF) interval. The step 16 process flows to step 12 to determine the CPU activity level. If, on the other hand, the CPU activity level is a decrease over an immediately previous determination, the present invention increases the T(OFF) interval, as step 18 depicts, and process flow continues to step 12 again to determine the CPU activity level. Thus, closed loop 10 constantly adjusts the T(OFF) intervals to match the a CPU activity level.

In any operating system, two key logic points exist: (1) an IDLE, or "do nothing," loop within the operating system and (2) an operating system request channel that is usually available for services needed by the application software. By placing logic in line with these logic points, the present embodiment permits evaluating the type of activity requests that an application software makes or will make. With this type of information, the present embodiment makes it possible to achieve a feedback and control process for managing CPU dynamic operating characteristics. For example, knowing the type of activity requests make it possible to activate power conservation and to begin determining slice periods. A slice period is the number of T(ON) vs. T(OFF) intervals over time, computed by the activity level.

The present embodiment makes an assumption to determine CPU activity level. The present embodiment assumes that software programs that need service usually need additional services and that the period of time between service requests may be used to determine the activity level of any application software running on the computer, controlling CPU dynamic operating characteristics, e.g., power, as well as to provide slice counts for conservation.

Once the present embodiment interrupts the CPU during a power conservation slice, i.e., during T(OFF), for example, the CPU saves the interrupted routine's state prior to vectoring to the interrupt software. Since the power conservation software was operating during this conservation slice, the present embodiment returns control to the active power conservation loop which simply monitors the CPU's clock to determine the existence of an exit condition for the power conservation mode, thereby exiting from a T(OFF) state to a T(ON) state. The process flow adjusts the interval of the next power conservation state according to monitored activity level, as discussed above in connection with FIG. 1. Some implementations can create an automatic exit from T(OFF) by the hardware logic, thereby automatically forcing an exit from the power conservation loop for executing CPU instructions during a T(ON) interval.

FIGS. 2a through 2d depict the active power monitor function 20 of the present embodiment. In operation, the CPU installs active power monitor function 20 either via a program that the CPU read-only memory (ROM) stores or from an external device that stores the program in a random access memory (RAM). Once the CPU loads active power monitor function 20, active power monitor function 20 process flow goes to INIT step 22 for performing the steps of system interrupt initialization, user configuration setup, and system/application specific initialization. A hardware or software interrupt for an IDLE or "do nothing" function executes IDLE branch 24, which FIG. 2b more specifically sets out. The CPU entering either an IDLE or a "do nothing" loop (i.e., planned inactivity) causes this type of interrupt. A software or hardware interrupt that occurs due to an operating system or I/O service request or by an application program or internal operating system function executes ACTIVITY branch 26 of the ACTIVITY flowchart which FIG. 2d more fully describes.

Figure 2A:
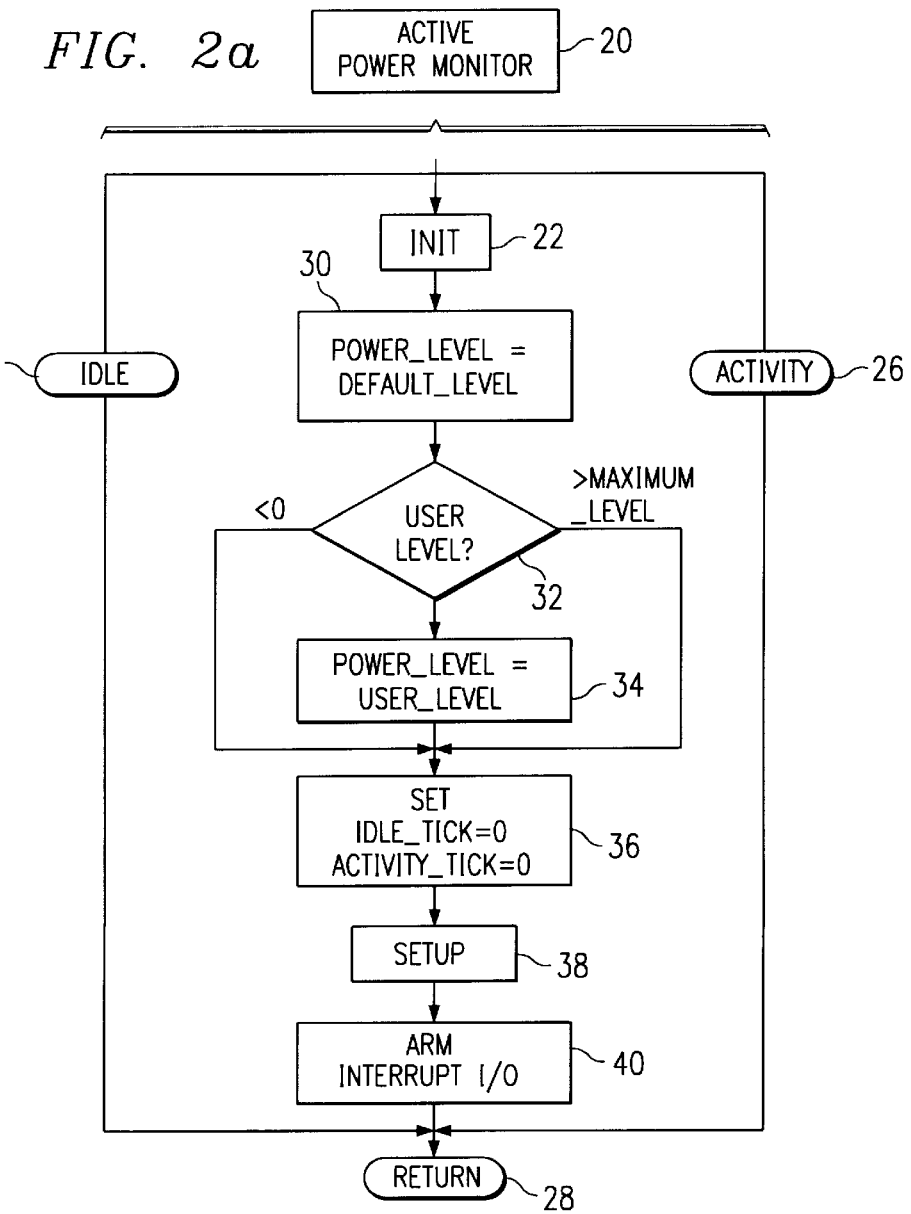

A program may, for example, be a request for a disk I/O function, a read, a print, a load, or another service. Regardless of the branch selected, RETURN vector 28 eventually returns process flow to the CPU operating system. The preferred embodiment executes INIT branch 22, which FIG. 2a shows in more detail, only once if the CPU loads active power monitor function 20 via program into ROM or every time during power up if the CPU loads monitory function 20 from the RAM of an external device. After INIT branch 22 of active power monitory function 20 fully executes monitor function 20, either IDLE branch 24 or ACTIVITY branch 26 branches process flow, depending on the type of CPU activity. Whenever the operating system goes into the power conservation mode, either IDLE branch 24 or ACTIVITY branch 26 branches are selected depending on the type of CPU activity. That is, IDLE branch 24 is selected for power conservation during planned inactivity, and ACTIVITY branch 26 is selected for power conservation during CPU activity.

Continuing with FIG. 2a for a closer look at INIT branch 22, after all system interrupt and variables are initialized, the routine continues at step 30 to set the POWER_LEVEL parameters equal to the DEFAULT-LEVEL. In operating systems where the user has input control for the POWER_LEVEL, the program, at step 32 checks to see if a USER_LEVEL parameter has been selected. If the USER_LEVEL parameter is less than zero or greater than the MAXIMUM_LEVEL, the system uses the DEFAULT_LEVEL parameter value. Otherwise, INIT branch 22 continues onto step 34 which sets the POWER_LEVEL parameter value equal to the USER_LEVEL parameter.

According to the present embodiment of the invention, INIT branch 22 at step 36 sets the variable IDLE_TICK to zero and the variable ACTIVITY_TICK to zero. Under an MS/DOS implementation, the IDLE_TICK variable refers to the number of interrupts found in a "do nothing" loop. The ACTIVITY_TICK variable represents the number of interrupts an activity interrupt causes. The number of interrupts, in turn, determines the CPU activity level. The Tick count represents a delta time, $\Delta T_i$, for the next interrupt. The IDLE_TICK is a constant delta time, $\Delta T_i$, from one tick to another, unless a software interrupt occurs to overwrite this period. That is, a software interrupt may reprogram the delta time between interrupts.

After setting the IDLE_TICK and ACTIVITY_TICK variables to zero, INIT branch 28 continues on to SETUP step 38, at which time INIT branch 22 handles any application specific configuration fine-tuning in terms of system-specific details, and SETUP step 38 initializes active power monitor function 20. Next, INIT branch 22 arms the interrupt I/O, at step 40, with instructions to the hardware. This indicates to the hardware that it may take control at the next interrupt. INIT branch 22 then exits to the operating system, or whatever function originally called active power monitor 20, via RETURN vector 28.

FIG. 2b more fully describes IDLE branch 24 of active power monitor function 20. In response to a planned inactivity period of the CPU, active power monitor function 20 checks to see whether entry into IDLE branch 24 is permitted by first determining whether the activity interrupt, A, is currently busy. If the parameter BUSY_A equals the value of re-entry flag BUSY_FLAG as query 42 tests, this means that the CPU is busy and cannot now be put to sleep. Therefore, active power monitor function 20 immediately proceeds to RETURN I step 44 and exits the routine. RETURN I step 44 provides an indirect vector to the previous operating system IDLE vector interrupt for normal processing. The CPU stores this indirection vector before entering active power monitor function 20. In other words, RETURN I step 44 causes an interrupt return to the last chained vector.

If query 42 determines that the BUSY_A interrupt flag is not busy, then active power monitor function 20 checks to see if the BUSY_IDLE interrupt flag equals BUSY_FLAG at step 46. If so, this indicates that active power monitor function is already in IDLE branch 24 and, therefore, there should be no CPU interrupt. If BUSY_I equals BUSY_FLAG, IDLE branch 24 process flow goes to step 44.

If, however, neither the BUSY_A re-entry flag nor the BUSY_I re-entry flag have been set, IDLE branch 24 sets BUSY_I flag at step 48 for re-entry protection, i.e., BUSY_I is set to equal the BUSY_FLAG value. At step 50, the IDLE_TICK variable is incremented by one. The IDLE_TICK variable is the number of T(ON) before a T(OFF) interval. The number of IDLE interrupts and the SETUP interrupts, and the CPU activity level determine the value for IDLE_TICK. The IDLE_TICK variable increments by one to allow for smoothing of events. This permits a critical I/O activity to control smoothing.

At step 52, active power monitor function 20 checks to see if the IDLE_TICK variable equals the predetermined constant value, IDLE_MAXTICKS. IDLE_MAXTICKS is one of the constants that setup step 38 of INIT branch 38 initializes and remains constant for a given CPU. In the present embodiment, the constant parameter IDLE_MAXTICKS permits self-tuning of the activity level. If the variable, IDLE_TICK, does not equal the constant IDLE_MAXTICKS, IDLE branch 24 clears the BUSY_I flag at step 54 and exits the process flow by proceeding to RETURN I indirect IDLE branch 24 flow back to vector 44. If, however, the IDLE_TICK variable equals IDLE_MAXTICKS, then the IDLE_TICK variable is equal to the IDLE_START_TICKS constant (which may or may not be zero) at step 56. In general, if the particular CPU can have its clock stopped and still properly function, IDLE_START_TICKS will equal zero. Otherwise, IDLE_START_TICKS assumes some predetermined value appropriate for the given CPU. This step determines the self-tuning aspect of the present embodiment by specifying how often active power monitoring function 20 may perform the rest of the sleep functions. By setting IDLE_START_TICKS equal to IDLE_MAXTICKS minus one, the present embodiment achieves a continuous T(OFF) interval. At query 58, IDLE branch 24 checks the POWER_LEVEL parameter level. If the POWER_LEVEL parameter is equal to zero, IDLE branch 24 clears the BUSY_I flag, at the POWER_LEVEL parameter 54, and proceeds to RETURN I indirect vector 44 to return control to the operating system, so it may continue what it was originally doing before entering active power monitor function 20.

If, however, the POWER_LEVEL parameter value does not equal zero at query 60, IDLE branch 24 determines whether an interrupt mask is in place. The system/application software sets the INTERRUPT_MASK variable and determines whether interrupts are available to active power monitor function 20. If query 60 determines that interrupts are NOT_AVAILABLE, then IDLE branch 24 clears the BUSY_I re-entry flag and returns control to the operating system to permit the CPU to continue what it was doing before it entered active power monitor function 20. Operating systems, as well as application software, can set the T(ON) interval to yield a continuous T(ON) state by setting the interrupt mask equal to the NOT-AVAILABLE value or flag.

When an interrupt is AVAILABLE, active power monitor function 20 proceeds to the SAVE POWER subroutine 62 which fully executes during one T(OFF) period that the hardware state establishes. For example, in the preferred embodiment, the longest possible interval could be 18 milliseconds, which is the longest time between two ticks or interrupts from the real-time clock. During SAVE POWER subroutine 62, the CPU clock steps down to a sleep clock level.

Once a critical I/O operation forces the T(ON) intervals to begin, the IDLE branch 24 interrupt tends to remain ready for additional critical I/O requests. As the CPU becomes busy with critical I/O, fewer T(OFF) intervals become available. Conversely, as critical I/O requests decrease, and the time intervals between them increase, more T(OFF) intervals become available. IDLE branch 24 provides a self-tuning system based on feedback from activity interrupts that tends to provide more T(OFF) intervals as the CPU activity level slows.

FIG. 2c shows and the associated text more fully describes that as soon as active power monitor function 20 completes SAVE POWER subroutine 250, BUSY_I re-entry flag clears, at step 54, and control returns through RETURN I vector 44 to whatever operating system originally requested active power monitor function 20.

Referring more particularly to FIG. 2c, there appears flowchart 80 that depicts SAVE POWER subroutine 62. Active power monitor function 20 determines the I/O hardware high speed clock at step 82. The next step 84 of SAVE POWER subroutine 62 sets the CURRENT_CLOCK_RATE equal to the relevant high speed clock and saves this value in CPUs having multiple level high speed clocks. Thus, if a particular CPU possesses 12 MHZ and 6 MHZ high speed clocks, active power monitor function 20 must determine which high speed clock controls the CPU before active power monitor function 20 reduces power. This assures that the CPU reestablishes the CPU at the proper high speed clock upon awakening. At step 84, SAVE POWER subroutine sets the SAVE_CLOCK_RATE variable equal to the CURRENT_CLOCK_RATE value that step 82 determined. The SAVE_CLOCK_RATE 84 is not used when there is only one high speed clock for the CPU. Active power monitor function 20 now continues to SLEEP CLOCK step 86, which sends a pulse function 20 to the hardware selector (shown in FIG. 5) to put the CPU clock to sleep by lowering or stopping its clock frequency. The I/O port hardware sleep clock is at much lower oscillations than the CPU clock normally employed.

At this point, either of two events can happen. A system/application interrupt may occur or a real-time clock interrupt may occur. If a system/application interrupt 88 occurs, active power monitor function 20 proceeds to interrupt routine 90. SAVE POWER routine 62 processes the interrupt as soon as possible, arms interrupt I/O at step 92, and returns to determine whether there an interrupt exists, at query 94. Since in this case there has been an interrupt, Step 96 uses the SAVE_CLOCK_RATE value to determine which high speed clock to return the CPU to. The flowchart 80 for SAVE POWER subroutine 62 terminates at RETURN vector 98. If, however, query 94 determines that there is no system/application interrupt, SAVE POWER subroutine 62 continues to wait until a real-time clock interrupt occurs, as query 94 discerns. Once such an interrupt occurs, SAVE POWER subroutine 62 reestablishes the CPU at the stored SAVE_CLOCK_RATE. If the sleep clock rate was not a stopped clock rate, i.e., the sleep clock rate was not zero, control passes at a slow clock and SAVE POWER subroutine 62 executes interrupt loop through query 94 and steps 88 through 92. If, on the other hand, control passes when there is a zero sleep clock rate, SAVE POWER subroutine 62 executes the interrupt loop that includes query 94 and steps 88 through 92 only once before returning the CPU clock to SAVE_CLOCK_RATE 96, after which process flow continues to RETURN vector 98.

Figure 2D:
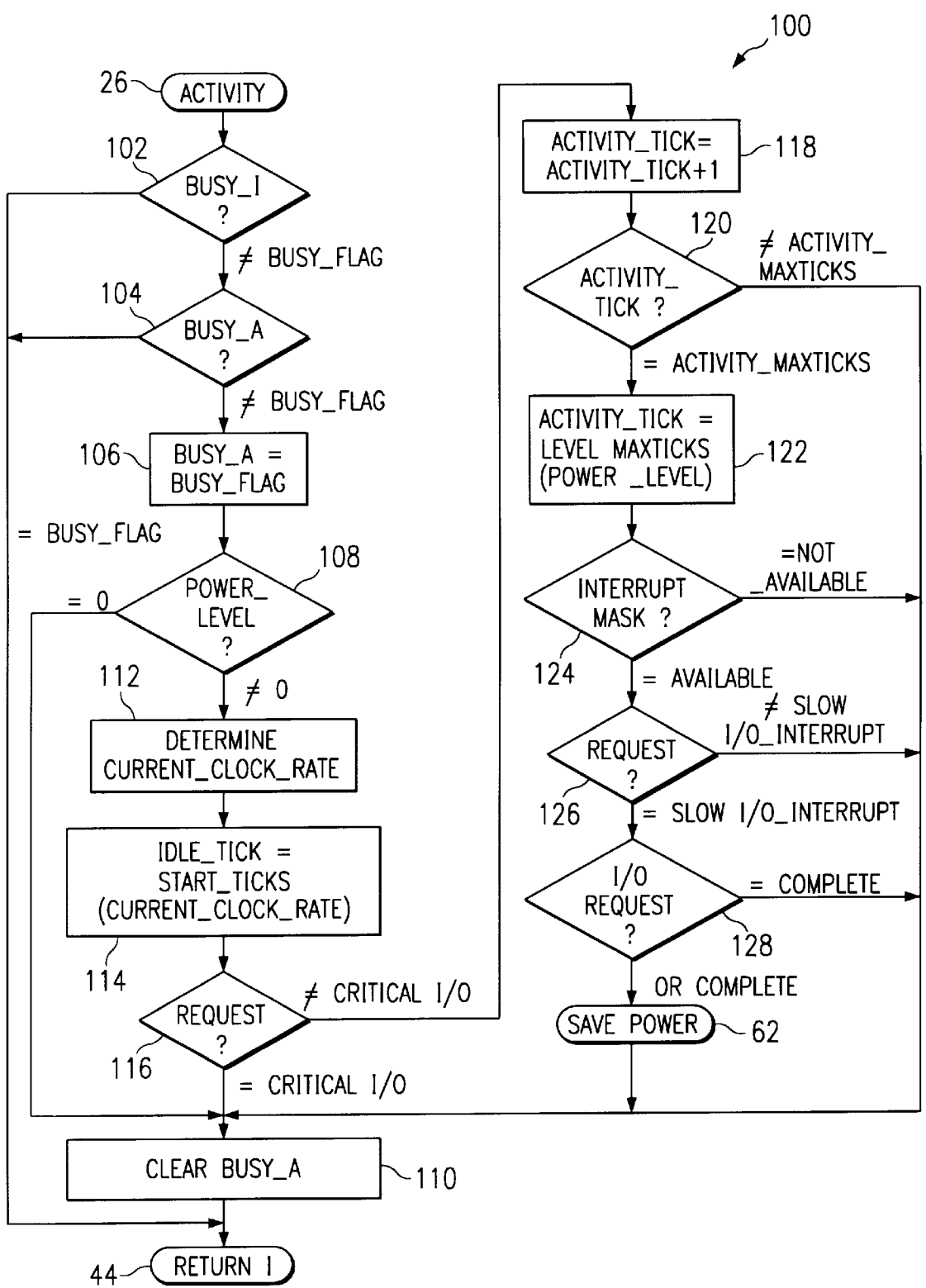

Consider now FIG. 2d, in which flowchart 100 shows the process flow for ACTIVITY branch 26 that an application/system activity request triggers via an operating system service request interrupt. ACTIVITY branch 26 begins with re-entry protection. Active power monitor function 20 determines, at step 102, whether the BUSY_I variable has been set to the BUSY_FLAG value. If it has, this means that the active power monitor function 20 system is already in IDLE branch 24 and cannot be interrupted. If the BUSY_I equals the BUSY_FLAG value, active power monitor function 20 exits by process flow going to RETURN I vector 44, which is an indirect vector to an old activity vector interrupt for normal processing. RETURN 1 vector 44 returns CPU operation to normal position via an interrupt vector that becomes operational after the operating system performs the requested service.

If the BUSY_I flag variable does not equal the BUSY_FLAG value, this means that active power monitor function 20 is not accessing IDLE branch 22. Active power monitor determines function 20 at query 104 if the BUSY_A flag equals the BUSY_FLAG value. If so, ACTIVITY branch 26 returns control to the computer system at this point. This means that ACTIVITY branch 26 is already in use and cannot be interrupted. If the BUSY_A flag has not been set, i.e., BUSY_A does not equal the BUSY_FLAG value, active power monitor function 20 sets the BUSY_A parameter equal to the BUSY_FLAG value at step 106 in order to prevent the interruption while it executes. At query 108, ACTIVITY branch 26 determines the POWER_LEVEL parameter value. If the POWER_LEVEL parameter value equals zero, active power monitor function 20 exits ACTIVITY branch 26 after first, at step 110, clearing the BUSY_A re-entry flag. If, however, the POWER_LEVEL parameter does not equal zero, ACTIVITY branch 26 next determines the value of the CURRENT_CLOCK_RATE parameters of the I/O hardware. As was true with step 84 the SAVE POWER subroutine of FIG. 2, step 112, ACTIVITY branch 26 of FIG. 2d uses the CURRENT_CLOCK_RATE parameter value if there are multiple level high speed clocks for a given CPU. Otherwise, the CURRENT_CLOCK_RATE parameter value always equals the CPU high speed clock. After step 112 determines the CURRENT_CLOCK_RATE parameter value, step 114 sets the IDLE_TICK parameter value equal to the constant START_TICKS. The START_TICKS constant is established for the previously determined CURRENT_CLOCK_RATE. The current high speed clock that is active establishes the T(OFF) intervals.

The next step of ACTIVITY branch 26 is to determine, at query 116, that a request has been made A request is an input by the application software running on the computer for a particular type of service needed. At query 116, ACTIVITY branch 26 determines whether the request is a CRITICAL I/O. A CRITICAL I/O continuously forces T(ON) to lengthen until the T(ON) is greater than the T(OFF). If the request is a CRITICAL I/O, active power monitor function 20 exits ACTIVITY branch 26 after first clearing the BUSY-A reentry flag at step 110. If, on the other hand, the request is not a CRITICAL I/O, then ACTIVITY branch 26 increments the ACTIVITY_TICK parameter by one at step 118, and process flow continues to query 120 which determines whether the ACTIVITY_TICK parameter value now equals the ACTIVITY_MAXTICKS constant value. The test of query 120 allows a smoothing from a CRITICAL I/O and makes the system ready from another CRITICAL I/O during subsequent ACTIVITY_TICK T(ON) intervals. Assuming that the ACTIVITY_TICK parameter value does not equal the ACTIVITY_MAXTICKS constant value, ACTIVITY branch 26 process flow proceeds after clearing the BUSY_A re-entry flag, at step 110, to RETURN I vector 44. If, on the other hand, the ACTIVITY_TICK equals the constant value, ACTIVITY_MAXTICKS, at step 122, ACTIVITY branch 26 sets the ACTIVITY_TICK parameter to the constant value LEVEL_MAXTICKS. ACTIVITY branch 26 establishes the LEVEL_MAXTICKS value for the particular POWER LEVEL that query 108 determines.

At query 124, ACTIVITY branch 26 determines whether an interrupt mask exists. System application software sets an interrupt mask. Setting the interrupt mask to NOT_AVAILABLE flag value creates a continuous T(ON) state which means that there are no interrupts available at this time. In this instance, process flow for ACTIVITY branch 26 goes to step 110 for clearing the BUSY_A reentry flag and continuing to RETURN I vector 44. If, however, an interrupt mask is AVAILABLE, ACTIVITY branch 26 determines, at query 126, whether the request that query 116 identified was for a SLOW I/O_INTERRUPT. SLOW I/O_INTERRUPT requests may have a delay until the I/O device becomes "ready." During the "make ready" operation, a continuous T(OFF) interval may begin and continue for conserving power. Thus, if the request is not a SLOW I/O_INTERRUPT, ACTIVITY branch 26 process flow goes to step 110 for clearing the BUSY_A re-entry flag and continuing to RETURN I vector 44. If, however, the request is a SLOW I/O_INTERRUPT, and time yet exists before the I/O device becomes "ready," ACTIVITY branch 26 then determines, at query 128, whether the I/O request is COMPLETE. In essence, therefore, query 128 determines whether the associated I/O device is ready. If the I/O device is not ready, active power monitor function 20 forces T(OFF) to lengthen. This forces the CPU to wait, or sleep; until the SLOW I/O device is ready. At this point, it has time to save power. Therefore, ACTIVITY branch 26 enters SAVE POWER subroutine 62, which FIG. 2e and the accompanying text described in detail. If query 128 determines that the I/O request is COMPLETE, control returns to the operating system by process flow proceeding to step 110 for clearing the BUSY_A re-entry flag and continuing to RETURN I vector 44.

The present embodiment of the invention not only provides for active power monitoring, but also provides a method and system for managing other CPU dynamic operating characteristics, as well. Such other dynamic operating characteristics may be, for example, the emission of undesireable electromagnetic frequency radiation or failure of the CPU to continue to operate within a predetermined temperature band after repeated adjustments according to the present invention. In particular, the present embodiment provides, as FIG. 3 depicts, an active thermal management method and system that includes a real-time feedback loop for temperature control that is transparent to the user and that operates in a manner similar to SAVE POWER subroutine 62 of FIG. 2c.

FIG. 3 depicts THERMAL MANAGEMENT subroutine 130 as a flowchart that begins at step 132. To implement THERMAL MANAGEMENT subroutine 130, active power monitor function 20 may be modified to become more generally an active monitor function having not only the ability to monitor power consumption by the associated CPU and computer system, but also other CPU dynamic operating characteristics. In essence, therefore, just as active power monitor function 20 may call SAVE POWER subroutine 62 via IDLE branch 24 and ACTIVITY branch 26, the more general active monitor function may call THERMAL MANAGEMENT subroutine 130 when it is intended that THERMAL MANAGEMENT subroutine 130 assume CPU temperature control operations. A key difference, however, is that as opposed to calling SAVE POWER subroutine 62 at a point where activity levels are low, the present embodiment calls THERMAL MANAGEMENT subroutine 130 when temperature conditions approach or have a likelihood of approaching CPU thermal limits.

In particular, the active monitor function of the present embodiment may call THERMAL MANAGEMENT subroutine 130 in ACTIVITY branch 26 in the event that the BUSY_A parameter equals the BUSY_FLAG constant value. From that point onward, process flow would proceed as THERMAL MANAGEMENT flow diagram 130 depicts.

Referring more particularly to FIG. 3, there appears, at step 132, the initializing step for THERMAL MANAGEMENT subroutine 130. THERMAL MANAGEMENT subroutine 130 determines the value for the CURRENT_CLOCK_RATE parameter at step 134. The next step 136 sets the CURRENT_CLOCK_RATE parameter equal to the relevant high speed clock and saves this value in the event that the CPU has multiple level high speed clocks. Thus, if a particular CPU possesses 12 MHZ and 6 MHZ high speed clocks, the active monitor function must determine which high speed clock controls the CPU before the active monitor function responds to an excess temperature or temperature change condition in the CPU. This assures that the CPU reestablishes operation at the proper high speed upon awakening. At step 136, THERMAL MANAGEMENT subroutine 130 sets the SAVE_CLOCK_RATE parameter value that step 134 determined. The present embodiment preferably does not use THE SAVE_CLOCK_RATE step 136 when there is only one high-speed clock for the CPU.

THERMAL MANAGEMENT subroutine 130 continues to step 138 at which a count of the number of instructions that the CPU is to process occurs. The present embodiment may include a look-up table that the associated computer system ROM stores. The look-up table differentiates between instructions that require I/O and instructions that involve CPU operation without I/O.

Following COUNT_INSTRUCTION_LIST step 138, query 140 determines whether THERMAL_INTERRUPT query 140 parameter value equals the constant value THERMAL_SETPOINT. This indicates the need for a thermal interrupt. A thermal interrupt may be an interrupt for stoping or altering operation of the CPU in response to an undesireable temperature condition. If the value for the THERMAL_INTERRUPT parameter does not equal the THERMAL_SETPOINT value, the THERMAL MANAGEMENT subroutine 130 process flow continues to COMPUTE BOUND subroutine 142. On the other hand, if a THERMAL_INTERRUPT equals THERMAL_SETPOINT, process flow proceeds to step 144, at which point the CPU clock shifts TO A LOWER SLEEP CLOCK RATE. From SLEEP CLOCK rate step 144, process flow goes to query 146 to test whether process flow is to exit THERMAL MANAGEMENT subroutine 132. If process flow is not to exit THERMAL MANAGEMENT subroutine 132, process flow returns to query 140 to continually test whether the thermal interrupt condition exists.

If the CPU is to exit THERMAL MANAGEMENT subroutine 132, query 146 directs process flow to RETURN vector 148. This returns process flow to the active monitor function previously described. This may occur for a variety of reasons, such as the active monitor function going to IDLE branch 22 of FIG. 2b. As long as the thermal interrupt condition exists, THERMAL MANAGEMENT subroutine 130 operates the CPU at the slower SLEEP CLOCK rate of step 144.

In the event that THERMAL MANAGEMENT subroutine 132 directs process flow to COMPUTE BOUND subroutine 142, process flow occurs as COMPUTE BOUND subroutine flow diagram 150 of FIG. 4 depicts. Beginning at COMPUTE BOUND subroutine step 142, process flow goes to query 152 which tests whether the CPU is in a compute-bound state. If the CPU is not in a compute-bound state, then process flow proceeds to RETURN vector 154. RETURN vector 154 directs THERMAL MANAGEMENT subroutine 130 process flow back to THERMAL_INTERRUPT query 140 (see FIG. 3).

If the CPU is in a compute-bound state, process flow of COMPUTE BOUND subroutine 142 proceeds to query 156.

A technical advantage that the present invention provides is the ability to preview or predict the operating characteristics of the CPU. By counting the number of instructions and determining their type, the present embodiment determines whether the CPU will be in a compute-bound mode of operation wherein little or no input/output and, hence, no slow-down of and no input/output function to the CPU will occur. The determination of whether the CPU is in a compute-bound state derives from the count of instructions that the CPU is to execute, as made by COUNT_INSTRUCTION_LIST step 138. The present embodiment includes a comparator for comparing the instructions that the CPU is to execute to elements of the look-up table that the computer system holds in a ROM location. The look-up table provides a characterization of instruction types as ones that include an I/O function and those that have no I/O function and that only involve processing or computational operations of the CPU. The present embodiment provides a predetermined threshold for the number of computational instructions that may be in sequence, with no intermittent I/O instructions that include I/O function. If the number of instructions having no I/O function exceeds the predetermined threshold number, then the present embodiment considers the CPU to be in a compute-bound state.

Upon COMPUTE BOUND subroutine 142 determining that the CPU is in a compute-bound state, process flow continues to query 156, which tests whether the CPU will establish a thermal interrupt condition during the compute-bound state. This may occur to prevent the CPU from reaching the thermal interrupt or, if desired, to adjust the thermal interrupt to a new thermal interrupt level. Accordingly, if at query 156, COMPUTE BOUND subroutine 142 determines that the CPU will reach a thermal interrupt during the compute-bound state, process flow goes to query 158. If, on the other hand, no thermal interrupt condition will occur during the compute-bound state, process flow goes to RETURN vector 154 to continue within THERMAL MANAGEMENT subroutine 130.

The present embodiment provides the ability to adjust the constant value, THERMAL_SETPOINT, for example, in the event that, while the CPU may need the thermal interrupt setpoint during the compute-bound state, the compute-bound state will not be sufficiently long to adversely affect the CPU. In other words, under ordinary conditions, the thermal interrupt condition may be set so that if the CPU reaches this temperature, then a margin of safety assures that no thermal damage occurs to the CPU. For example, there may be a significant adjustable margin of safety that may be adjusted when it is known why the CPU temperature is reaching the constant value THERMAL_SETPOINT. The case rise temperature rate for a compute-bound CPU causes the CPU temperature to rise in a known and predictable way.

Based on knowledge of both the number and type of instructions that the CPU is to execute during a compute-bound state, COMPUTE BOUND subroutine 142 may determine that, while the CPU will reach or exceed the CPU temperature setpoint value, THERMAL_SETPOINT, it will do so for only a brief duration. This brief duration, COMPUTE BOUND subroutine 142 may determine, may not damage or threaten the CPU. To accommodate this situation, query 158 tests whether COMPUTE BOUND subroutine 145 should adjust the existing THERMAL_SETPOINT value. If the existing THERMAL_SETPOINT constant value is to be adjusted, process flow proceeds to step 160 for adjusting the THERMAL_SETPOINT value. From step 160, process flow continues to RETURN vector 154. If, on the other hand, the value of THERMAL_SETPOINT is to remain at its existing value, process flow goes to query 162, to test whether the THERMAL_INTERRUPT parameter value is to be set to the THERMAL_SETPOINT constant value.

If the THERMAL_INTERRUPT parameter value is to be set to the THERMAL_SETPOINT constant value, process flow goes to step 164, at which point COMPUTE BOUND subroutine 142 sets the THERMAL_INTERRUPT parameter value to the THERMAL_SETPOINT constant value. Process flow then continues to RETURN vector 154. If, on the other hand, the THERMAL_INTERRUPT variable value is not to be set equal to the THERMAL_SETPOINT value, process flow simply continues to RETURN vector 154. From this point onward, process flow proceeds to RETURN vector 148 and back to THERMAL MANAGEMENT subroutine 142.

Self-tuning is inherent within the control system of continuous feedback loops. The software of the present invention can detect when CPU activity is low and, therefore, when the power conservation aspect of the present invention may be activated. On the other hand, the present embodiment determines when CPU activity is high and thermal management may be activated. Once the power conservation monitor is activated, a prompt return to full speed CPU clock operation within the interval is achieved so as to not degrade the performance of the computer. Likewise, once a thermal setpoint condition goes away, and thermal management is no longer needed, a prompt return to full speed CPU clock operation within the CPU may be achieved to minimize perceived effects of thermal management. To achieve this prompt return to full speed CPU clock operation, the preferred embodiment of the present invention employs some associated hardware.

Attention is now drawn to FIG. 5 which shows a simplified schematic diagram representing the associated hardware employed by the present invention for active power conservation and thermal management. When the active power monitor function 20 determines the CPU is ready to sleep, it writes to an I/O port (not shown) which causes a pulse on the SLEEP line. The rising edge of this pulse on the SLEEP line causes flip flop 200 to clock a high to Q and a low to Q-. This causes the AND/OR logic, which includes AND gates 202 and 204 and gate 206 to select the pulses traveling the SLEEP CLOCK line from SLEEP CLOCK oscillator 208 to be sent to and used by the CPU CLOCK. SLEEP CLOCK oscillator 208 is a slower clock than the CPU clock used during normal CPU activity. The high coming from the Q of flip flop 200 ANDed using AND gate 202 with the pulses coming from SLEEP CLOCK oscillator 208 and ORed using OR gate 206 with the result of the low on the Q- of flip flop 200 and further ANDed using AND gate 204 with the pulse generated along the HIGH SPEED CLOCK line by the HIGH SPEED CLOCK oscillator 210 to yield the CPU CLOCK. When the I/O port designates SLEEP CLOCK, the CPU CLOCK is then equal to the SLEEP CLOCK oscillator 208 value. If, on the other hand, an interrupt occurs, an interrupt value clears flip flop 200, the interrupt forces the AND/OR selector, which includes AND gate 202 and 204 with OR gate 206 to choose the HIGH SPEED CLOCK value. The AND/OR selector returns the CPU CLOCK value to the value coming from HIGH SPEED CLOCK oscillator 210. Therefore, during any power conservation operation on the CPU, the detection of any interrupt within the system restores CPU operation to the full clock rate prior to vectoring and processing the interrupt.

It should be noted that the associated hardware needed, external to each of the CPUs for any given system, may be different based on the operating system used, whether the CPU can be stopped, etc. Nevertheless, the scope of the present invention should not be limited by possible system specific modifications needed to permit the present invention to actively conserve power or manage thermal conditions in the numerous available portable computer systems. For example, two actual implementations are shown in FIGS. 6 and 7, discussed below.

Many VSLI designs today allow for clock switching of the CPU speed. The logic to switch from a null clock or slow clock to a fast clock logic is the same as that which allows the user to change speeds by a keyboard command. The added logic of the active monitor function working with such switching logic, causes an immediate return to a fast clock upon detection of any interrupt. This simple logic is the key to the necessary hardware support to interrupt the CPU and thereby allows the processing of the interrupt at full speed.

The method to control CPU dynamic operating characteristics, including power consumption and temperature, under MS-DOS employs the MS-DOS IDLE loop trap to gain access to the "do nothing" loop. The IDLE loop provides special access to application software and operating system operations that are in a state of idle or low activity, careful examination is required to determine the activity level at any given point within the system. Feedback loops are used from the interrupt 21H service request to determine the activity level. The prediction of activity level is determined by interrupt 21H requests, from which the present invention thereby sets the slice periods for "sleeping" (i.e., slowing down or stopping) the CPU. An additional feature allows the user to modify the slice depending on the activity level of interrupt 21H.

Figure 6:
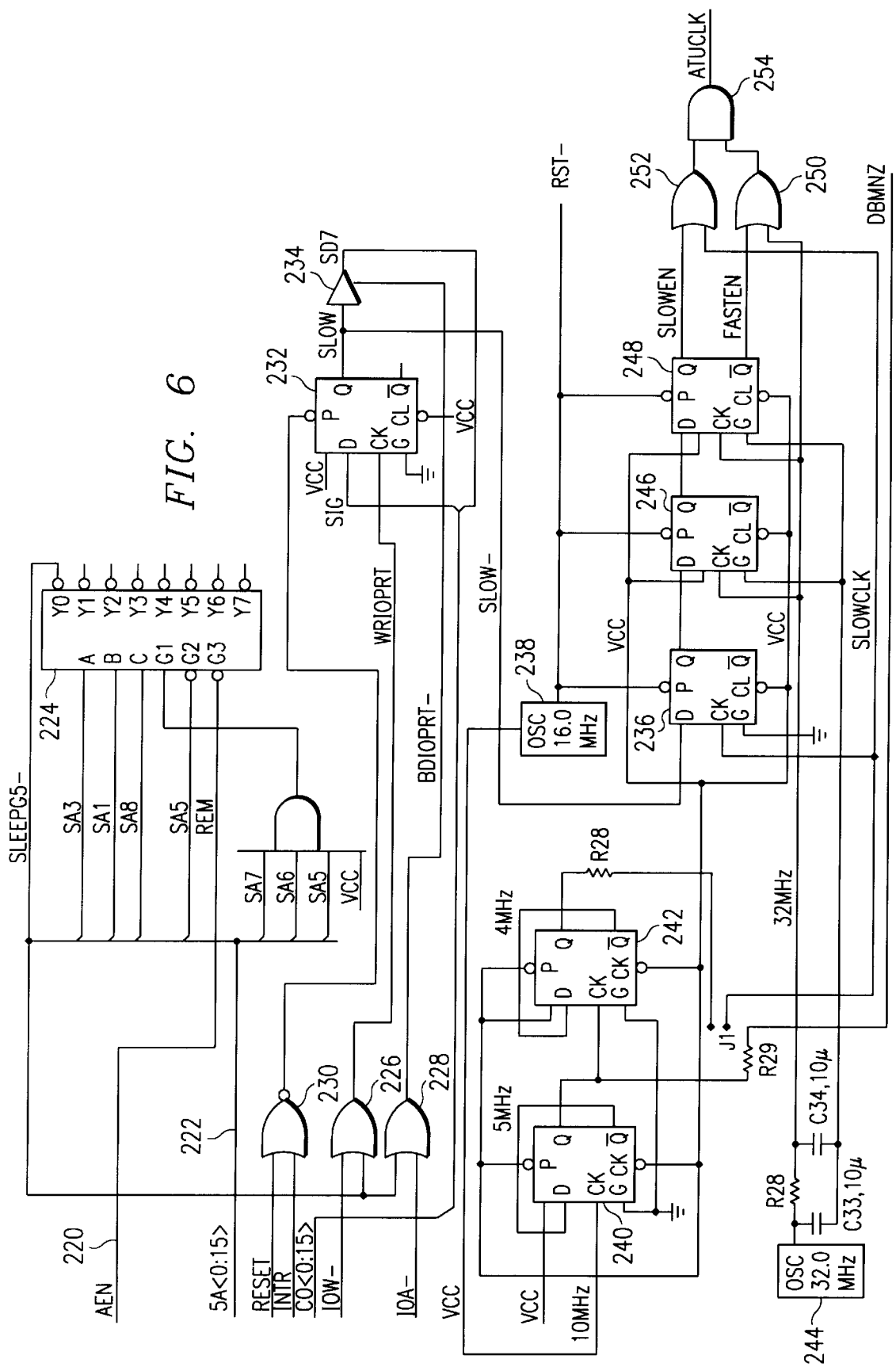
FIG. 6 shows a schematic of the sleep hardware for one embodiment of the present invention.
Figure 7:
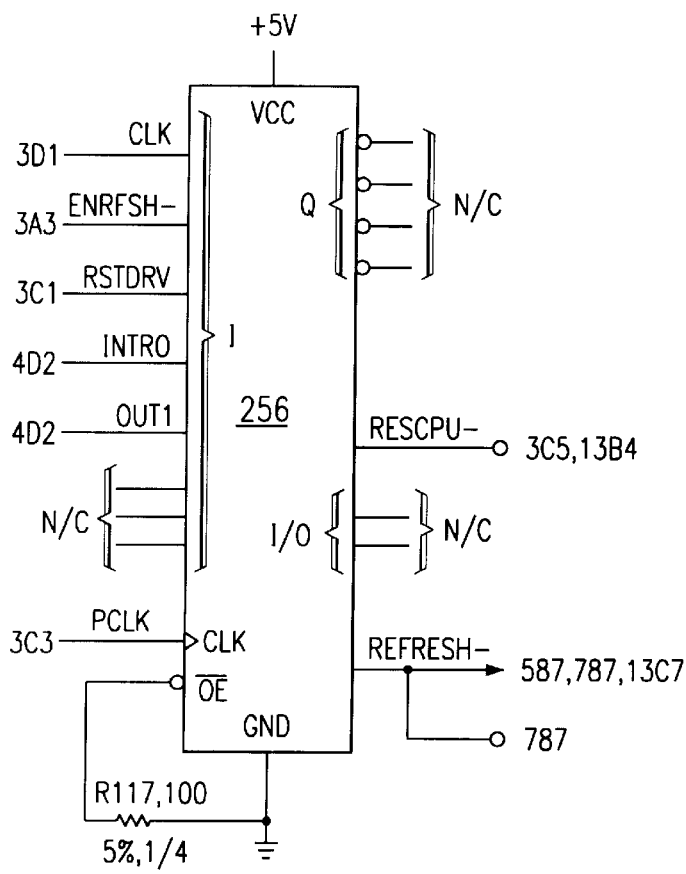
FIG. 7 illustrates a schematic of the sleep hardware for another embodiment of the present invention.

Looking now at FIG. 6, which depicts a schematic of an actual sleep hardware implementation for a system such as the Intel 80386. Incidentally, the Intel 80386 CPU cannot have its clock stopped. Address enable bus 220 and address bus 222 provide CPU input to demultiplexer 224. The output of demultiplexer 224 is sent along SLEEPCS as an input to OR gates 226 and 228. The other inputs to OR gates 226 and 228 are the I/O write control line and the I/O read control line, respectively. The outputs of these gates, in addition to NOR gate 230, are applied to D flip flop 232 to decode the port. "INTR" is the interrupt input from the I/O port (peripherals) into NOR gate 230, which causes the logic hardware to switch back to the high speed clock. The output of flip flop 232 is then fed, along with the output from OR gate 226, to tristate buffer 234 to enable it to read back what is on the port. All of the above-identified hardware is used by the read/write I/O port (peripherals) to select the power saving "Sleep" operation. The output "SLOW-" is equivalent to "SLEEP" in FIG. 2, and is an input to flip flop 236, discussed later.

The output of SLEEP CLOCK oscillator 238 is divided into two slower clocks by D flip flops 240 and 242. In the particular implementation appearing in FIG. 6, 16 MHZ sleep clock oscillator 238 is divided into 4 MHZ and 8 MHZ clocks. Jumper Jl selects which clock is to be the "SLEEP CLOCK."

In this particular implementation, high speed clock oscillator 244 is a 32 MHZ oscillator, although this particular speed is not a requirement of the present invention. The 32 MHZ oscillator is put in series with a resistor (for the implementation shown, 33 ohms), which is in series with two parallel capacitors (10 pF). The result of such oscillations is tied to the clocks of D flip flops 246 and 248.

D flip flops 236, 246 and 248 are synchronizing flip flops. Although D flip flops 236 and 246 were not shown in the simplified sleep hardware for the active power monitor function 20 of FIGS. 2a through 2d, these flip flops ensure that the clock switch occurs only on clock edge. As can be seen in FIG. 6, as with flip flop 200 of FIG. 5, the output of flip flop 248 either activates OR gate 250 or OR gate 252, depending upon whether the CPU is to sleep ("FASTEN-") or awaken ("SLOWEN-").

OR gates 250, 252 and AND gate 254 are the functional equivalents to the AND/OR selector of FIG. 5. They are responsible for selecting either the "slowclk" (slow clock, also known as SLEEP CLOCK) or high speed clock (designated as 32 MHZ on the incoming line). In this implementation, the Slow clock is either 4 MHZ or 8 MHZ, depending upon jumper Jl, and the high speed clock is 32 MHz. The output of AND gate 254, herein labeled the ATUCLK signal, establishes the rate of the CPU clock, and is the equivalent of CPU CLOCK of FIG. 5.

Consider now FIG. 7, which depicts a schematic of another actual sleep hardware implementation for a system such as the Intel 80286. Incidentally, the Intel 80286 CPU can have its clock stopped. The Western Digital FE3600 VLSI is used for the speed switching with a special external PAL 256 to control the interrupt gating which wakes up the CPU on any interrupt. With the software power conservation aspect of the present invention monitoring of the interrupt acceptance occurs. This activates the next P(i)ΔT$_i$ interval after the interrupt.

Any interrupt request to the CPU will return the system to normal operation. An interrupt request, INTRQ to the CPU causes the PAL to issue a WAKE_UP signal on the RESCPU line to the FE3001 which in turn enables the CPU and the DMA clocks to bring the system back to its normal state. This is the equivalent of the "INTERRUPT–" of FIG. 5. The INTERRUPT REQUEST is synchronized to avoid confusing the state machine so that interrupt signal, INTDET, is detected only while the cycle is active. The rising edge of the RESCPU signal wakes up the FE 3001, which in turn releases the whole system from the SLEEP MODE.

Implementation for the 386SX is different only in the external hardware and software loops for performing the CPU dynamic operating characteristic features of the present embodiment. The software loop will set external hardware to switch to the high speed clock on interrupt prior to vectoring the interrupt. Once return is made to the power conservation software, the active monitor function detects the high speed clock cycle and resets the hardware for full clock operation.

Implementation for OS/2 uses the "do nothing" loop programmed as a THREAD running in background operation with low priority. Once the THREAD is activated, the CPU sleep, or low speed clock, operation will be activated until an interrupt occurs thereby placing the CPU back to the original clock rate.

Although interrupts have been employed to wake up the CPU in the preferred embodiment of the present invention, it should be realized that any periodic activity within the system, or applied to the system, could also be used for the same function.

A difference between the power conservation aspect and the thermal management aspect of the present invention is the need on the part of the thermal management aspect to sense the temperature of the CPU. This may be done by a thermistor or other direct sensing mechanism that provides a temperature reading to THERMAL MANAGEMENT subroutine 132. The thermistor or other temperature sensing device is well known in the art. Moreover, sensed operating characteristics may be obtained by other direct reading devices or sensors, according to the CPU dynamic operating characteristics of interest to the particular application.

In summary, the present invention provides a method for controlling the sensed CPU dynamic operating characteristics and includes the steps of sensing at least one CPU dynamic operating characteristic. The present invention senses the clock rate for the CPU at the time of sensing the at least one dynamic operating characteristic. The present method and apparatus determines that a setpoint interrupt condition exists by virtue of at least one CPU dynamic operating characteristic establishing a predetermined relationship relative to a predetermined setpoint associated with the at least one CPU dynamic operating characteristic. In the event that the interrupt condition exists, the present invention includes the step of controlling the clock rate relative to sensed clock rate. On the other hand, in the event that the setpoint interrupt condition does not exist, the present invention includes the step of and circuitry for repeating the above determining and controlling steps.

Another attractive feature of the present embodiment is the ability to control, not only a single CPU according to sensed CPU dynamic operating characteristics such as power consumption and temperature, but also to control multiple CPUs supporting a given computer system(s). In a dual-CPU computer system, for example, the present invention may coordinate the tasks of controlling sensed CPU dynamic operating characteristics to maintain an overall desired level of computer system performance. For instance, one CPU may be in a compute-bound mode, as determined by COMPUTE BOUND subroutine 130 applied to both CPUs. The other CPU of the dual-CPU computer may not be in a compute-bound, and instead executing instructions, many of which include I/O functions. By realizing that the case rise temperature coefficient of the compute-bound CPU will increase the CPU temperature at the existing clock rate, the present invention may slow down the compute-bound CPU's clock for it to avoid reaching a thermal setpoint. Depending on whether constant computer system performance is required, the present invention may increase the clock rate of the other CPU so as to maintain a constant average or overall clock rate, and, hence, achieve a uniform performance level for the computer system.

Figure 8:
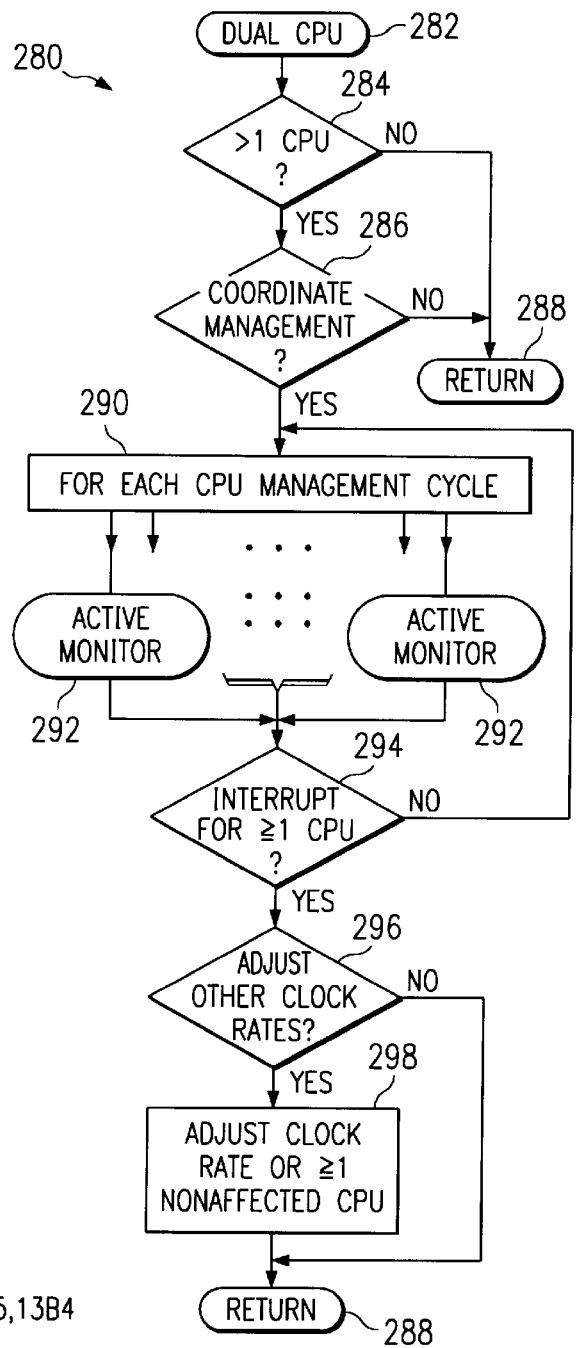
FIG. 8 includes a flowchart of the multiple CPU dynamic operating characteristics control features of an alternative embodiment of the invention.

To illustrate one aspect of the multiple-CPU embodiment of the present invention, FIG. 8 shows multiple-CPU flow chart 280, which begins at multiple CPU start step 282. Multiple-CPU start step 282 may first test whether there is the need to control more than one CPU, at query 284. If more than one CPU is to be controlled, then process flow goes to query 286. Otherwise, process flow goes to RETURN vector 288 so that the CPU can return to whatever operation existed prior to executing MULTIPLE CPU subroutine 280.

At query 286, MULTIPLE CPU subroutine 280 tests whether coordinated management of the multiple CPUs is to occur. If not, process flow goes to RETURN vector 288. Otherwise, process flow proceeds to step 290, which serves as a vector for directing the control of each of the multiple CPUs. For each CPU that is to experience control of sensed CPU dynamic operating characteristics, process flow goes to ACTIVE MONITOR subroutine 292. ACTIVE MONITOR subroutine 292 may, in essence, be equivalent to active power monitor function 20, an active monitor function such as the monitor function for THERMAL MANAGEMENT subroutine 132, a monitor function that coordinates both power conservation and thermal management, or another monitor function or subroutine that controls the CPU in response to one or more sensed CPU dynamic operating characteristics.

As the process flow through MULTIPLE CPU subroutine 280 continues, for each CPU, a test occurs of whether there is a setpoint interrupt condition for at least one of the coordinated CPUs at query 294. If there is no such setpoint-associated interrupt condition, process flow goes back to query 294, to continue to test for the existence of a setpoint-associated interrupt condition. Where there is such an interrupt condition, process flow goes to query 296 to test whether it is desired or intended that MULTIPLE CPU subroutine 280 control or adjust the clock rate of the unaffected CPU. If adjustment of the unaffected CPU is not to occur, from query 296, process flow goes to RETURN vector 288. Otherwise, process flow continues to step 298, at which point the unaffected CPU's clock rates may be adjusted to maintain a constant or achieve a desired overall computer system clock rate.

While several implementations of the preferred embodiment of the invention has been shown and described, various modifications and alternate embodiments will occur to those skilled in the art. Accordingly, it is intended that the invention be limited only in terms of the appended claims.

What is claimed is:

1. A method for controlling sensed CPU dynamic operating characteristics, comprising the steps of:
    (a) sensing at least one dynamic operating characteristic of a central processing unit (CPU) in a computer, said CPU operating at a first clock rate;
    (b) determining that a setpoint interrupt condition exists by virtue of said at least one dynamic operating characteristic establishing a predetermined relationship relative to a predetermined setpoint associated with said at least one dynamic operating characteristic;
    (c) in the event that said setpoint interrupt condition exists, modifying said first clock rate;
    (d) in the event that said setpoint interrupt condition does not exist, determining whether said CPU is in a compute-bound state and, if said CPU is in a commute-bound state, further determining whether said interrupt condition will exist during said compute-bound state.

2. The method of claim 1, wherein said method for controlling sensed CPU dynamic operating characteristics comprises a method for managing the CPU dynamic thermal characteristics and further, wherein said step for sensing said at least one dynamic operating characteristic comprises the step of sensing the operating temperature of said CPU and further, wherein said determining step comprises the step of determining the existence of an interrupt condition wherein said operating temperature establishes a predetermined relationship relative to a predetermined temperature setpoint.

3. The method of claim 1, wherein said step for sensing said at least one dynamic operating characteristic further comprises the step of sensing the operating temperature of said CPU, and further wherein said determining step comprises the step of determining that said operating temperature approaches a predetermined temperature setpoint during a period in which said CPU is in a compute-bound state.

4. The method of claim 1, further comprising the steps of determining whether said CPU is available for power conservation and, if said CPU is available for power conservation, controlling said clock rate relative to a saved clock rate according to the existence of said interrupt condition and control signals arising from said power conservation.

5. The method of claim 1, where said step for sensing said at least one CPU dynamic operating characteristic of said CPU comprises the step of sensing the operating temperature of said CPU using a thermistor sensing device.

6. The method of claim 1, further comprising the step of storing said predetermined relationship and said predetermined setpoint in a memory location of said computer.

7. The method of claim 1, further comprising the step of storing said predetermined relationship and said predetermined setpoint in a memory location of said computer, said memory location comprising a register.

8. The method of claim 1, further comprising the step of storing said predetermined relationship and said predetermined setpoint in a memory location associated with said computer, said memory location comprising a circuit other than said CPU.

9. The method of claim 2, further comprising a method for coordinated real-time power conservation and controlling sensed dynamic thermal characteristics in said CPU, said real-time power conservation method operating in association with said method of controlling said sensed CPU dynamic thermal characteristics and comprising the steps of:
    determining whether said CPU is available for power conservation;
    if said CPU is available for power conservation, determining a current clock rate for said CPU;
    indicating to a hardware selector to reduce or stop the current clock rate provided to the CPU;
    determining whether a power conservation interrupt has occurred;
    if said power conservation interrupt has not occurred, repeating this step wherein said CPU remains in said power conservation mode until said power conservation interrupt has occurred; and
    if said power conservation interrupt has occurred, indicating to said hardware selector to restore said determined current clock rate to said CPU.

10. The method for coordinated real-time power conservation controlling sensed CPU dynamic thermal characteristics of claim 9, wherein said step of indicating to a hardware selector to reduce or stop the current clock rate provided to the CPU, further comprises the steps of:
    pulsing said hardware selector with a power conservation CPU command via a communication line to said hardware selector;
    selecting a power conservation clock by said hardware selector based on said power conservation CPU command; and
    passing pulses from said power conservation clock to said CPU to thereby place said CPU in a power conservation mode.

11. The method for coordinated real-time power conservation and controlling sensed CPU dynamic thermal characteristics of claim 9, wherein said step of determining whether a central processing unit (CPU) in a computer is available for power conservation, further comprises the steps of:
    checking to see if said CPU is already in said power conservation mode;
    if said CPU is not already in said power conservation mode, determining whether there are power conservation interrupts available to wake said CPU before said CPU is in said power conservation mode; and
    if power conservation interrupts are available, preventing said CPU from entering said power conservation mode.

12. The method for real-time power conservation of claim 9, wherein said step of determining whether a central processing unit (CPU) in a computer is available for power conservation, further comprises the steps of:
    checking to see if said CPU has received a request;
    if said CPU has received a request, determining whether said request is a critical input/output;
    preventing said CPU from entering said power conservation mode if said request is a critical input/output;
    if said request is not a critical input/output, determining whether there are any power conservation interrupts available to wake said CPU before said CPU enters said power conservation mode;
    preventing said CPU from entering said power conservation mode;

determining whether said request is from an input/output having a delay until the I/O device become ready; and prevent said CPU from entering said power conservation mode if said request is not from an input/output having a delay.

13. A method for controlling sensed CPU dynamic operating characteristics, comprising the steps of:
(a) sensing at least one dynamic operating characteristic of a central processing unit (CPU) in a computer, said CPU operating at a first clock rate;
(b) determining that a setpoint interrupt condition exists by virtue of said at least one dynamic operating characteristic establishing a predetermined relationship relative to a predetermined setpoint associated with said at least one dynamic operating characteristic;
(c) in the event that said setpoint interrupt condition exists, modifying said first clock rate;
(d) in the event that said setpoint interrupt condition does not exist, determining whether said CPU is in a compute-bound state;
(e) if said CPU is in a compute-bound state, determining whether said at least one dynamic operating characteristic will exist in said interrupt condition during said compute-bound state, and,
(f) in the event that said interrupt condition will exist during said compute-bound state, modifying said interrupt condition.

14. The method of claim 13, wherein said method for controlling sensed CPU dynamic operating characteristics comprises a method for managing the CPU dynamic thermal characteristics and further, wherein said step for sensing said at least one dynamic operating characteristic comprises the step of sensing the operating temperature of said CPU and further, wherein said determining step comprises the step of determining the existence of an interrupt condition wherein said operating temperature establishes a predetermined relationship relative to a predetermined temperature setpoint.

15. The method of claim 13, wherein said step for sensing said at least one dynamic operating characteristic further comprises the step of sensing the operating temperature of said CPU, and further wherein said determining step comprises the step of determining that said operating temperature approaches a predetermined temperature setpoint during a period in which said CPU is in a compute-bound state.

16. The method of claim 13, further comprising the steps of determining whether said CPU is available for power conservation and, if said CPU is available for power conservation, modifying said first clock rate relative to a saved clock rate according to the existence of said interrupt condition and control signals arising from said power conservation.

17. The method of claim 13, where said step for sensing said at least one CPU dynamic operating characteristic of said CPU comprises the step of sensing the operating temperature of said CPU using a thermistor sensing device.

18. The method of claim 13, further comprising the step of storing said predetermined relationship and said predetermined setpoint in a memory location of said computer.

19. The method of claim 13, further comprising the step of storing said predetermined relationship and said predetermined setpoint in a memory location of said computer, said memory location comprising a register.

20. The method of claim 13, further comprising the step of storing said predetermined relationship and said predetermined setpoint in a memory location associated with said computer, said memory location comprising a circuit other than said CPU.

21. The method of claim 14, further comprising a method for coordinated real-time power conservation and controlling sensed dynamic thermal characteristics in said CPU, said real-time power conservation method operating in association with said method of controlling said sensed CPU dynamic thermal characteristics and comprising the steps of:
determining whether said CPU is available for power conservation;
if said CPU is available for power conservation, determining a current clock rate for said CPU;
indicating to a hardware selector to reduce or stop the current clock rate provided to the CPU;
determining whether a power conservation interrupt has occurred;
if said power conservation interrupt has not occurred, repeating this step wherein said CPU remains in said power conservation mode until said power conservation interrupt has occurred; and
if said power conservation interrupt has occurred, indicating to said hardware selector to restore said determined current clock rate to said CPU.

22. The method for coordinated real-time power conservation controlling sensed CPU dynamic thermal characteristics of claim 21, wherein said step of indicating to a hardware selector to reduce or stop the current clock rate provided to the CPU, further comprises the steps of:
pulsing said hardware selector with a power conservation CPU command via a communication line to said hardware selector;
selecting a power conservation clock by said hardware selector based on said power conservation CPU command; and
passing pulses from said power conservation clock to said CPU to thereby place said CPU in a power conservation mode.

23. The method for coordinated real-time power conservation and controlling sensed CPU dynamic thermal characteristics of claim 21, wherein said step of determining whether a central processing unit (CPU) in a computer is available for power conservation, further comprises the steps of:
checking to see if said CPU is already in said power conservation mode;
if said CPU is not already in said power conservation mode, determining whether there are power conservation interrupts available to wake said CPU before said CPU is in said power conservation mode; and
if power conservation interrupts are available, preventing said CPU from entering said power conservation mode.

24. The method for real-time power conservation of claim 21, wherein said step of determining whether a central processing unit (CPU) in a computer is available for power conservation, further comprises the steps of:
checking to see if said CPU has received a request;
if said CPU has received a request, determining whether said request is a critical input/output;
preventing said CPU from entering said power conservation mode if said request is a critical input/output;
if said request is not a critical input/output, determining whether there are any power conservation interrupts available to wake said CPU before said CPU enters said power conservation mode;
preventing said CPU from entering said power conservation mode;

determining whether said request is from an input/output having a delay until the I/O device become ready; and prevent said CPU from entering said power conservation mode if said request is not from an input/output having a delay.

25. A method for controlling sensed CPU dynamic operating characteristics, comprising the steps of:
(a) sensing at least one dynamic operating characteristic of a central processing unit (CPU) in a computer, said CPU operating at a first clock rate;
(b) determining that a setpoint interrupt condition exists by virtue of said at least one dynamic operating characteristic establishing a predetermined relationship relative to a predetermined setpoint associated with said at least one dynamic operating characteristic;
(c) in the event that said setpoint interrupt condition exists, modifying said first clock rate;
(d) in the event that said setpoint interrupt condition does not exist, determining whether said CPU is in a compute-bound state; and
(e) if said CPU is in a compute-bound state, determining the duration of said compute-bound state by determining the amount of compute-bound instructions that said CPU is to execute during said compute-bound state.

26. The method of claim 25, wherein said method for controlling sensed CPU dynamic operating characteristics comprises a method for managing the CPU dynamic thermal characteristics and further, wherein said step for sensing said at least one dynamic operating characteristic comprises the step of sensing the operating temperature of said CPU and further, wherein said determining step comprises the step of determining the existence of an interrupt condition wherein said operating temperature establishes a predetermined relationship relative to a predetermined temperature setpoint.

27. The method of claim 25, wherein said step for sensing said at least one dynamic operating characteristic further comprises the step of sensing the operating temperature of said CPU, and further wherein said determining step comprises the step of determining that said operating temperature approaches a predetermined temperature setpoint during a period in which said CPU is in a compute-bound state.

28. The method of claim 25, further comprising the steps of determining whether said CPU is available for power conservation and, if said CPU is available for power conservation, modifying said first clock rate relative to a saved clock rate according to the existence of said interrupt condition and control signals arising from said power conservation.

29. The method of claim 25, where said step for sensing said at least one CPU dynamic operating characteristic of said CPU comprises the step of sensing the operating temperature of said CPU using a thermistor sensing device.

30. The method of claim 25, further comprising the step of storing said predetermined relationship and said predetermined setpoint in a memory location of said computer.

31. The method of claim 25, further comprising the step of storing said predetermined relationship and said predetermined setpoint in a memory location of said computer, said memory location comprising a register.

32. The method of claim 25, further comprising the step of storing said predetermined relationship and said predetermined setpoint in a memory location associated with said computer, said memory location comprising a circuit other than said CPU.

33. The method of claim 26, further comprising a method for coordinated real-time power conservation and controlling sensed dynamic thermal characteristics in said CPU, said real-time power conservation method operating in association with said method of controlling said sensed CPU dynamic thermal characteristics and comprising the steps of:
determining whether said CPU is available for power conservation;
if said CPU is available for power conservation, determining a current clock rate for said CPU;
indicating to a hardware selector to reduce or stop the current clock rate provided to the CPU;
determining whether a power conservation interrupt has occurred;
if said power conservation interrupt has not occurred, repeating this step wherein said CPU remains in said power conservation mode until said power conservation interrupt has occurred; and
if said power conservation interrupt has occurred, indicating to said hardware selector to restore said determined current clock rate to said CPU.

34. The method for coordinated real-time power conservation controlling sensed CPU dynamic thermal characteristics of claim 33, wherein said step of indicating to a hardware selector to reduce or stop the current clock rate provided to the CPU, further comprises the steps of:
pulsing said hardware selector with a power conservation CPU command via a communication line to said hardware selector;
selecting a power conservation clock by said hardware selector based on said power conservation CPU command; and
passing pulses from said power conservation clock to said CPU to thereby place said CPU in a power conservation mode.

35. The method for coordinated real-time power conservation and controlling sensed CPU dynamic thermal characteristics of claim 33, wherein said step of determining whether a central processing unit (CPU) in a computer is available for power conservation, further comprises the steps of:
checking to see if said CPU is already in said power conservation mode;
if said CPU is not already in said power conservation mode, determining whether there are power conservation interrupts available to wake said CPU before said CPU is in said power conservation mode; and
if power conservation interrupts are available, preventing said CPU from entering said power conservation mode.

36. The method for real-time power conservation of claim 33, wherein said step of determining whether a central processing unit (CPU) in a computer is available for power conservation, further comprises the steps of:
checking to see if said CPU has received a request;
if said CPU has received a request, determining whether said request is a critical input/output;
preventing said CPU from entering said power conservation mode if said request is a critical input/output;
if said request is not a critical input/output, determining whether there are any power conservation interrupts available to wake said CPU before said CPU enters said power conservation mode;
preventing said CPU from entering said power conservation mode;
determining whether said request is from an input/output having a delay until the I/O device become ready; and prevent said CPU from entering said power conservation mode if said request is not from an input/output having a delay.

37. A method for controlling sensed CPU dynamic operating characteristics, comprising the steps of:
   (a) sensing at least one dynamic operating characteristic of a central processing unit (CPU) in a computer, said CPU operating at a first clock rate;
   (b) determining that a setpoint interrupt condition exists by virtue of said at least one dynamic operating characteristic establishing a predetermined relationship relative to a predetermined setpoint associated with said at least one dynamic operating characteristic;
   (c) in the event that said setpoint interrupt condition exists, modifying said first clock rate;
   (d) in the event that said setpoint interrupt condition does not exist, determining whether said CPU is in a compute-bound state and, if said CPU is in a compute-bound state, determining the duration of said compute-bound state by determining the amount of compute-bound instructions that said CPU is to execute during said compute-bound state; and
   (e) modifying said interrupt condition in the event that said interrupt condition will exist during said compute-bound state.

38. The method of claim 37, wherein said method for controlling sensed CPU dynamic operating characteristics comprises a method for managing the CPU dynamic thermal characteristics and further, wherein said step for sensing said at least one dynamic operating characteristic comprises the step of sensing the operating temperature of said CPU and further, wherein said determining step comprises the step of determining the existence of an interrupt condition wherein said operating temperature establishes a predetermined relationship relative to a predetermined temperature setpoint.

39. The method of claim 37, wherein said step for sensing said at least one dynamic operating characteristic further comprises the step of sensing the operating temperature of said CPU, and further wherein said determining step comprises the step of determining that said operating temperature approaches a predetermined temperature setpoint during a period in which said CPU is in a compute-bound state.

40. The method of claim 37, further comprising the steps of determining whether said CPU is available for power conservation and, if said CPU is available for power conservation, modifying said first clock rate relative to a saved clock rate according to the existence of said interrupt condition and control signals arising from said power conservation.

41. The method of claim 37, where said step for sensing said at least one CPU dynamic operating characteristic of said CPU comprises the step of sensing the operating temperature of said CPU using a thermistor sensing device.

42. The method of claim 37, further comprising the step of storing said predetermined relationship and said predetermined setpoint in a memory location of said computer.

43. The method of claim 37, further comprising the step of storing said predetermined relationship and said predetermined setpoint in a memory location of said computer, said memory location comprising a register.

44. The method of claim 37, further comprising the step of storing said predetermined relationship and said predetermined setpoint in a memory location associated with said computer, said memory location comprising a circuit other than said CPU.

45. The method of claim 38, further comprising a method for coordinated real-time power conservation and controlling sensed dynamic thermal characteristics in said CPU, said real-time power conservation method operating in association with said method of controlling said sensed CPU dynamic thermal characteristics and comprising the steps of:
   determining whether said CPU is available for power conservation;
   if said CPU is available for power conservation, determining a current clock rate for said CPU;
   indicating to a hardware selector to reduce or stop the current clock rate provided to the CPU;
   determining whether a power conservation interrupt has occurred;
   if said power conservation interrupt has not occurred, repeating this step wherein said CPU remains in said power conservation mode until said power conservation interrupt has occurred; and
   if said power conservation interrupt has occurred, indicating to said hardware selector to restore said determined current clock rate to said CPU.

46. The method for coordinated real-time power conservation controlling sensed CPU dynamic thermal characteristics of claim 45, wherein said step of indicating to a hardware selector to reduce or stop the current clock rate provided to the CPU, further comprises the steps of:
   pulsing said hardware selector with a power conservation CPU command via a communication line to said hardware selector;
   selecting a power conservation clock by said hardware selector based on said power conservation CPU command; and
   passing pulses from said power conservation clock to said CPU to thereby place said CPU in a power conservation mode.

47. The method for coordinated real-time power conservation and controlling sensed CPU dynamic thermal characteristics of claim 45, wherein said step of determining whether a central processing unit (CPU) in a computer is available for power conservation, further comprises the steps of:
   checking to see if said CPU is already in said power conservation mode;
   if said CPU is not already in said power conservation mode, determining whether there are power conservation interrupts available to wake said CPU before said CPU is in said power conservation mode; and
   if power conservation interrupts are available, preventing said CPU from entering said power conservation mode.

48. The method for real-time power conservation of claim 45, wherein said step of determining whether a central processing unit (CPU) in a computer is available for power conservation, further comprises the steps of:
   checking to see if said CPU has received a request;
   if said CPU has received a request, determining whether said request is a critical input/output;
   preventing said CPU from entering said power conservation mode if said request is a critical input/output;
   if said request is not a critical input/output, determining whether there are any power conservation interrupts available to wake said CPU before said CPU enters said power conservation mode;
   preventing said CPU from entering said power conservation mode;
   determining whether said request is from an input/output having a delay until the I/O device become ready; and prevent said CPU from entering said power conservation mode if said request is not from an input/output having a delay.

49. A method for controlling sensed CPU dynamic operating characteristics, comprising the steps of:

(a) sensing at least one dynamic operating characteristic of a central processing unit (CPU) in a computer, said CPU operating at a first clock rate;

(b) determining that a setpoint interrupt condition exists by virtue of said at least one dynamic operating characteristic establishing a predetermined relationship relative to a predetermined setpoint associated with said at least one dynamic operating characteristic;

(c) in the event that said setpoint interrupt condition exists, modifying said first clock rate;

(d) in the event that said setpoint interrupt condition does not exist, determining whether said CPU is in a compute-bound state;

(e) if said CPU is in a compute-bound state, determining the duration of said compute-bound state; and (f) further modify said first clock rate to avoid the existence of said interrupt condition during said compute-bound state.

50. The method of claim 49, wherein said method for controlling sensed CPU dynamic operating characteristics comprises a method for managing the CPU dynamic thermal characteristics and further, wherein said step for sensing said at least one dynamic operating characteristic comprises the step of sensing the operating temperature of said CPU and further, wherein said determining step comprises the step of determining the existence of an interrupt condition wherein said operating temperature establishes a predetermined relationship relative to a predetermined temperature setpoint.

51. The method of claim 49, wherein said step for sensing said at least one dynamic operating characteristic further comprises the step of sensing the operating temperature of said CPU, and further wherein said determining step comprises the step of determining that said operating temperature approaches a predetermined temperature setpoint during a period in which said CPU is in a compute-bound state.

52. The method of claim 49, further comprising the steps of determining whether said CPU is available for power conservation and, if said CPU is available for power conservation, modifying said first clock rate relative to a saved clock rate according to the existence of said interrupt condition and control signals arising from said power conservation.

53. The method of claim 49, where said step for sensing said at least one CPU dynamic operating characteristic of said CPU comprises the step of sensing the operating temperature of said CPU using a thermistor sensing device.

54. The method of claim 49, further comprising the step of storing said predetermined relationship and said predetermined setpoint in a memory location of said computer.

55. The method of claim 49, further comprising the step of storing said predetermined relationship and said predetermined setpoint in a memory location of said computer, said memory location comprising a register.

56. The method of claim 49, further comprising the step of storing said predetermined relationship and said predetermined setpoint in a memory location associated with said computer, said memory location comprising a circuit other than said CPU.

57. The method of claim 50, further comprising a method for coordinated real-time power conservation and controlling sensed dynamic thermal characteristics in said CPU, said real-time power conservation method operating in association with said method of controlling said sensed CPU dynamic thermal characteristics and comprising the steps of:

determining whether said CPU is available for power conservation;

if said CPU is available for power conservation, determining a current clock rate for said CPU;

indicating to a hardware selector to reduce or stop the current clock rate provided to the CPU;

determining whether a power conservation interrupt has occurred;

if said power conservation interrupt has not occurred, repeating this step wherein said CPU remains in said power conservation mode until said power conservation interrupt has occurred; and if said power conservation interrupt has occurred, indicating to said hardware selector to restore said determined current clock rate to said CPU.

58. The method for coordinated real-time power conservation controlling sensed CPU dynamic thermal characteristics of claim 57, wherein said step of indicating to a hardware selector to reduce or stop the current clock rate provided to the CPU, further comprises the steps of:

pulsing said hardware selector with a power conservation CPU command via a communication line to said hardware selector;

selecting a power conservation clock by said hardware selector based on said power conservation CPU command; and passing pulses from said power conservation clock to said CPU to thereby place said CPU in a power conservation mode.

59. The method for coordinated real-time power conservation and controlling sensed CPU dynamic thermal characteristics of claim 57, wherein said step of determining whether a central processing unit (CPU) in a computer is available for power conservation, further comprises the steps of:

checking to see if said CPU is already in said power conservation mode;

if said CPU is not already in said power conservation mode, determining whether there are power conservation interrupts available to wake said CPU before said CPU is in said power conservation mode; and if power conservation interrupts are available, preventing said CPU from entering said power conservation mode.

60. The method for real-time power conservation of claim 57, wherein said step of determining whether a central processing unit (CPU) in a computer is available for power conservation, further comprises the steps of:

checking to see if said CPU has received a request;

if said CPU has received a request, determining whether said request is a critical input/output;

preventing said CPU from entering said power conservation mode if said request is a critical input/output;

if said request is not a critical input/output, determining whether there are any power conservation interrupts available to wake said CPU before said CPU enters said power conservation mode;

preventing said CPU from entering said power conservation mode;

determining whether said request is from an input/output having a delay until the I/O device become ready; and prevent said CPU from entering said power conservation mode if said request is not from an input/output having a delay.

61. An apparatus for controlling sensed CPU dynamic operating characteristics, comprising:
- (a) sensing circuitry for sensing at least one dynamic operating characteristic of a central processing unit (CPU) in a computer, said CPU operating at a first clock rate;
- (b) setpoint instructions for operating on said CPU for determining that a setpoint interrupt condition exists by virtue of said at least one dynamic operating characteristic establishing a predetermined relationship relative to a predetermined setpoint associated with said at least one dynamic operating characteristic;
- (c) control instructions for modifying said first clock rate in the event that said setpoint interrupt condition exists; and
- (d) compute-bound determining instructions for determining whether said CPU is in a compute-bound state and, if said CPU is in a compute-bound state, further determining whether said interrupt condition will exist during said compute-bound state.

62. The apparatus of claim 61, further comprising managing instructions for managing the CPU dynamic thermal characteristics, and wherein said temperature sensing circuitry further comprises dynamic temperature sensing circuitry for sensing said at least one dynamic operating characteristic comprises the step of sensing the operating temperature of said CPU and further, wherein said setpoint instructions further comprise instructions for determining the existence of an interrupt condition wherein said operating temperature establishes a predetermined relationship relative to a predetermined temperature setpoint.

63. The apparatus of claim 61, wherein said sensing circuitry further comprises circuitry for sensing the operating temperature of said CPU, and further wherein said setpoint instructions further comprise instructions for determining that said operating temperature approaches a predetermined temperature setpoint during a period in which said CPU is in a compute-bound state.

64. The apparatus of claim 61, further comprising power conservation instructions for determining whether said CPU is available for power conservation and, if said CPU is available for power conservation, modifying said first clock rate relative to a saved clock rate according to the existence of said interrupt condition and control signals arising from said power conservation.

65. The apparatus of claim 61, where said sensing circuitry comprises a thermistor sensing device.

66. The apparatus of claim 61, further comprising memory circuitry for storing said predetermined relationship and said predetermined setpoint in a memory location of said computer.

67. An apparatus for controlling sensed CPU dynamic operating characteristics, comprising:
- (a) sensing circuitry for sensing at least one dynamic operating characteristic of a central processing unit (CPU) in a computer, said CPU operating at a first clock rate;
- (b) setpoint instructions for operating on said CPU for determining that a setpoint interrupt condition exists by virtue of said at least one dynamic operating characteristic establishing a predetermined relationship relative to a predetermined setpoint associated with said at least one dynamic operating characteristic;
- (c) control instructions for modifying said first clock rate in the event that said setpoint interrupt condition exists; and
- (d) compute-bound determining instructions for determining whether said CPU is in a compute-bound state wherein said setpoint instructions further comprising instructions for determining whether said at least one dynamic operating characteristic will exist in said interrupt condition during said compute-bound state, and further comprising modifying instructions for modifying said interrupt condition in the event that said interrupt condition will exist during said compute-bound state.

68. The apparatus of claim 67, further comprising managing instructions for managing the CPU dynamic thermal characteristics, and wherein said temperature sensing circuitry further comprises dynamic temperature sensing circuitry for sensing said at least one dynamic operating characteristic comprises the step of sensing the operating temperature of said CPU and further, wherein said setpoint instructions further comprise instructions for determining the existence of an interrupt condition wherein said operating temperature establishes a predetermined relationship relative to a predetermined temperature setpoint.

69. The apparatus of claim 67, wherein said sensing circuitry further comprises circuitry for sensing the operating temperature of said CPU, and further wherein said setpoint instructions further comprise instructions for determining that said operating temperature approaches a predetermined temperature setpoint during a period in which said CPU is in a compute-bound state.

70. The apparatus of claim 67, further comprising power conservation instructions for determining whether said CPU is available for power conservation and, if said CPU is available for power conservation, modifying said first clock rate relative to a saved clock rate according to the existence of said interrupt condition and control signals arising from said power conservation.

71. The apparatus of claim 67, where said sensing circuitry comprises a thermistor sensing device.

72. The apparatus of claim 67, further comprising memory circuitry for storing said predetermined relationship and said predetermined setpoint in a memory location of said computer.

73. A method for controlling sensed CPU dynamic operating characteristics, comprising the steps of:
- (a) sensing circuitry for sensing at least one dynamic operating characteristic of a central processing unit (CPU) in a computer, said CPU operating at a first clock rate;
- (b) setpoint instructions for operating on said CPU for determining that a setpoint interrupt condition exists by virtue of said at least one dynamic operating characteristic establishing a predetermined relationship relative to a predetermined setpoint associated with said at least one dynamic operating characteristic;
- (c) control instructions for modifying said first clock rate in the event that said setpoint interrupt condition exists; and
- (d) compute-bound determining instructions for determining whether said CPU is in a compute-bound state and, if said CPU is in a compute-bound state, determining the duration of said compute-bound state by determining the amount of compute-bound instructions that said CPU is to execute during said compute-bound state.

74. The apparatus of claim 73, further comprising managing instructions for managing the CPU dynamic thermal characteristics, and wherein said temperature sensing circuitry further comprises dynamic temperature sensing circuitry for sensing said at least one dynamic operating characteristic comprises the step of sensing the operating temperature of said CPU and further, wherein said setpoint instructions further comprise instructions for determining the existence of an interrupt condition wherein said operating temperature establishes a predetermined relationship relative to a predetermined temperature setpoint.

75. The apparatus of claim 73, wherein said sensing circuitry further comprises circuitry for sensing the operating temperature of said CPU, and further wherein said setpoint instructions further comprise instructions for determining that said operating temperature approaches a predetermined temperature setpoint during a period in which said CPU is in a compute-bound state.

76. The apparatus of claim 73, further comprising power conservation instructions for determining whether said CPU is available for power conservation and, if said CPU is available for power conservation, modifying said first clock rate relative to a saved clock rate according to the existence of said interrupt condition and control signals arising from said power conservation.

77. The apparatus of claim 73, where said sensing circuitry comprises a thermistor sensing device.

78. The apparatus of claim 73, further comprising memory circuitry for storing said predetermined relationship and said predetermined setpoint in a memory location of said computer.

79. A method for controlling sensed CPU dynamic operating characteristics, comprising the steps of:
    (a) sensing circuitry for sensing at least one dynamic operating characteristic of a central processing unit (CPU) in a computer, said CPU operating at a first clock rate;
    (b) setpoint instructions for operating on said CPU for determining that a setpoint interrupt condition exists by virtue of said at least one dynamic operating characteristic establishing a predetermined relationship relative to a predetermined setpoint associated with said at least one dynamic operating characteristic;
    (c) control instructions for modifying said first clock rate in the event that said setpoint interrupt condition exists; and
    (d) compute-bound determining instructions for determining whether said CPU is in a compute-bound state and determining the duration of said compute-bound state by determining the amount of compute-bound instructions that said CPU is to execute during said compute-bound state, and, further, modifying said interrupt condition in the event that said interrupt condition will exist during said compute-bound state.

80. The apparatus of claim 79, further comprising managing instructions for managing the CPU dynamic thermal characteristics, and wherein said temperature sensing circuitry further comprises dynamic temperature sensing circuitry for sensing said at least one dynamic operating characteristic comprises the step of sensing the operating temperature of said CPU and further, wherein said setpoint instructions further comprise instructions for determining the existence of an interrupt condition wherein said operating temperature establishes a predetermined relationship relative to a predetermined temperature setpoint.

81. The apparatus of claim 79, wherein said sensing circuitry further comprises circuitry for sensing the operating temperature of said CPU, and further wherein said setpoint instructions further comprise instructions for determining that said operating temperature approaches a predetermined temperature setpoint during a period in which said CPU is in a compute-bound state.

82. The apparatus of claim 79, further comprising power conservation instructions for determining whether said CPU is available for power conservation and, if said CPU is available for power conservation, modifying said first clock rate relative to a saved clock rate according to the existence of said interrupt condition and control signals arising from said power conservation.

83. The apparatus of claim 79, where said sensing circuitry comprises a thermistor sensing device.

84. The apparatus of claim 79, further comprising memory circuitry for storing said predetermined relationship and said predetermined setpoint in a memory location of said computer.

85. A method for controlling sensed CPU dynamic operating characteristics, comprising the steps of:
    (a) sensing circuitry for sensing at least one dynamic operating characteristic of a central processing unit (CPU) in a computer, said CPU operating at a first clock rate;
    (b) setpoint instructions for operating on said CPU for determining that a setpoint interrupt condition exists by virtue of said at least one dynamic operating characteristic establishing a predetermined relationship relative to a predetermined setpoint associated with said at least one dynamic operating characteristic;
    (c) control instructions for modifying said first clock rate in the event that said setpoint interrupt condition exists; and
    (d) compute-bound determining instructions for determining whether said CPU is in a compute-bound state and, if said CPU is in a compute-bound state, determining the duration of said compute-bound state and further modify said first clock rate for avoiding the existence of said interrupt condition during said compute-bound state.

86. The apparatus of claim 85, further comprising managing instructions for managing the CPU dynamic thermal characteristics, and wherein said temperature sensing circuitry further comprises dynamic temperature sensing circuitry for sensing said at least one dynamic operating characteristic comprises the step of sensing the operating temperature of said CPU and further, wherein said setpoint instructions further comprise instructions for determining the existence of an interrupt condition wherein said operating temperature establishes a predetermined relationship relative to a predetermined temperature setpoint.

87. The apparatus of claim 85, wherein said sensing circuitry further comprises circuitry for sensing the operating temperature of said CPU, and further wherein said setpoint instructions further comprise instructions for determining that said operating temperature approaches a predetermined temperature setpoint during a period in which said CPU is in a compute-bound state.

88. The apparatus of claim 85, further comprising power conservation instructions for determining whether said CPU is available for power conservation and, if said CPU is available for power conservation, modifying said first clock rate relative to a saved clock rate according to the existence of said interrupt condition and control signals arising from said power conservation.

89. The apparatus of claim 85, where said sensing circuitry comprises a thermistor sensing device.

90. The apparatus of claim 85, further comprising memory circuitry for storing said predetermined relationship and said predetermined setpoint in a memory location of said computer.

\* \* \* \* \*

UNITED STATES PATENT AND TRADEMARK OFFICE
CERTIFICATE OF CORRECTION

PATENT NO. : 5,996,084
DATED : Nov. 30, 1999
INVENTOR(S) : Vaughn Watts

It is certified that error appears in the above-identified patent and that said Letters Patent is hereby corrected as shown below:

On title page, item [75]. The inventor's name should read as follows:
--LaVaughn F. Watts, Jr.--

Title page, insert the following item:
--[60] Provisional application No. 60/010,136, Jan. 17, 1996.--

Column 1, line 6, insert the following:
--CROSS REFERENCE TO RELATED APPLICATION
Reference is made to and priority claimed from U.S. provisional application Ser. No. 60/010,136, filed Jan. 17, 1996, entitled METHOD AND APPARATUS FOR REAL-TIME CPU THERMAL MANAGEMENT AND POWER CONSERVATION BY ADJUSTING CPU CLOCK FREQUENCY IN ACCORDANCE WITH CPU ACTIVITY.--

Signed and Sealed this

Twenty-ninth Day of August, 2000

*Attest:*

Q. TODD DICKINSON

*Attesting Officer*        *Director of Patents and Trademarks*

UNITED STATES PATENT AND TRADEMARK OFFICE
CERTIFICATE OF CORRECTION

PATENT NO. : 5,996,084
DATED : November 30, 1999
INVENTOR(S) : LaVaughn F. Watts, Jr.

Page 1 of 1

It is certified that error appears in the above-identified patent and that said Letters Patent is hereby corrected as shown below:

<u>Claims 73, 79 and 85,</u>
Line 1, "A method" should instead be -- An apparatus --.

Signed and Sealed this

Ninth Day of April, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.        : 5,996,084
APPLICATION NO. : 08/785619
DATED             : November 30, 1999
INVENTOR(S)      : LaVaughn F. Watts, Jr.

It is certified that error appears in the above-identified patent and that said Letters Patent is hereby corrected as shown below:

Assignee has discovered the following clerical error in the claims:

Col. 19, line 25, Claim 1, line 15, "commute-bound" should instead be --compute-bound--.

Reference to Claim 4, as originally filed, and as amended on May 14, 1999, clearly shows that -- compute-bound -- is the proper and correct phrase.

Signed and Sealed this

Twenty-seventh Day of March, 2007

JON W. DUDAS
*Director of the United States Patent and Trademark Office*